US012768765B2

(12) United States Patent
Thimsen et al.

(10) Patent No.: US 12,768,765 B2
(45) Date of Patent: Oct. 20, 2026

(54) QUARTZ CRYSTAL MICROBALANCE IMPACTOR

(71) Applicant: Washington University, St. Louis, MO (US)

(72) Inventors: Elijah Thimsen, St. Louis, MO (US); Eric Husmann, St. Louis, MO (US)

(73) Assignee: Washington University, St. Louis, MO (US)

( * ) Notice: Subject to any disclaimer, the term of this patent is extended or adjusted under 35 U.S.C. 154(b) by 263 days.

(21) Appl. No.: 18/720,699

(22) PCT Filed: Dec. 13, 2022

(86) PCT No.: PCT/US2022/052629
§ 371 (c)(1),
(2) Date: Jun. 17, 2024

(87) PCT Pub. No.: WO2023/172320
PCT Pub. Date: Sep. 14, 2023

(65) Prior Publication Data

US 2025/0052662 A1 Feb. 13, 2025

Related U.S. Application Data

(60) Provisional application No. 63/265,589, filed on Dec. 17, 2021.

(51) Int. Cl.
*G01N 15/06* (2024.01)

(52) U.S. Cl.
CPC ................................ *G01N 15/0656* (2013.01)

(58) Field of Classification Search
CPC ......... G01N 29/022; G01N 2291/0256; G01N 29/036; G01N 2291/0426; G01N 5/02; G01N 2291/0255; G01N 2291/014; G01N 33/54373; G01N 29/222; G01N 2291/021; G01N 2291/0215; G01N 2291/0423; G01N 2291/02809; G01N 33/5438; G01N 27/12;
(Continued)

(56) References Cited

U.S. PATENT DOCUMENTS 6,500,547 B1 * 12/2002 Potyrailo ........... G01N 33/1826 95/8
11,085,861 B1 * 8/2021 Chen ........................ G01N 1/04
(Continued)

FOREIGN PATENT DOCUMENTS

CN 107870197 A 4/2018
JP 2013096722 A * 5/2013
(Continued)

OTHER PUBLICATIONS

Chen et al., "A novel quartz crystal cascade impactor for real-time aerosol mass distribution measurement", Aerosol Science and Technology, 2016, vol. 50, No. 9, pp. 971-983.
(Continued)

*Primary Examiner* — Andre J Allen
(74) *Attorney, Agent, or Firm* — Armstrong Teasdale LLP

(57) ABSTRACT

The present disclosure is directed to a quartz crystal microbalance (QCM) impactor and method of using same. The QCM impactor is particularly useful for detecting particles at low mass concentrations, such as for semiconductor process monitoring applications.

18 Claims, 21 Drawing Sheets

(58) Field of Classification Search

CPC ....... G01N 29/2443; G01N 2291/0422; G01N 33/0031; G01N 2291/02818; G01N 2291/0427; G01N 29/326; G01N 5/00; G01N 11/16; G01N 33/0047; G01N 27/00; G01N 21/553; G01N 29/02; G01N 29/12; G01N 33/543; G01N 29/30; G01N 2291/0257; G01N 27/414; G01N 33/569; G01N 27/4145; G01N 27/126; G01N 9/002; G01N 33/0027; G01N 33/56983; G01N 33/497; G01N 21/554; G01N 29/4436; G01N 33/5308; G01N 33/00; G01N 33/54353; G01N 2291/022; G01N 2291/106; G01N 25/18; G01N 29/4427; G01N 33/54393; G01N 27/04; G01N 27/26; G01N 5/04; G01N 21/658; G01N 5/025; G01N 27/227; G01N 29/4472; G01N 2469/10; G01N 33/54306; G01N 17/00; G01N 2291/02845; G01N 29/032; G01N 33/54346; G01N 17/008; G01N 29/4418; G01N 29/46; G01N 2291/0258; G01N 27/4141; G01N 27/4146; G01N 33/34; G01N 2291/0224; G01N 33/0062; G01N 2027/222; G01N 2291/0226; G01N 33/48721; G01N 2291/0421; G01N 2333/005; G01N 2333/195; G01N 2333/43556; G01N 2333/44; G01N 2333/445; G01N 29/2462; G01N 33/48; G01N 33/53; G01N 33/56905; G01N 15/0606; G01N 2291/02854; G01N 27/16; G01N 27/18; G01N 29/041; G01N 33/0036; G01N 33/54366; G01N 2291/02466; G01N 33/0034; G01N 33/553; G01N 21/6428; G01N 21/648; G01N 2291/0228; G01N 33/50; G01N 21/77; G01N 2291/0254; G01N 27/127; G01N 27/327; G01N 27/3277; G01N 29/348; G01N 29/36; G01N 29/4463; G01N 1/40; G01N 2291/018; G01N 2291/2697; G01N 2333/522; G01N 2600/00; G01N 29/22; G01N 33/18; G01N 33/6857; G01N 33/6863; G01N 27/122; G01N 29/228; G01N 33/004; G01N 27/026; G01N 27/416; G01N 29/028; G01N 29/223; G01N 29/2437; G01N 29/32; G01N 33/2888; G01N 33/94; G01N 21/94; G01N 2291/02827; G01N 2333/11; G01N 27/125; G01N 33/56911; G01N 2223/07; G01N 2291/012; G01N 2291/0212; G01N 2291/02416; G01N 2291/02881; G01N 2333/165; G01N 33/1826; G01N 33/575; G01N 15/0637; G01N 19/00; G01N 27/121; G01N 27/22; G01N 29/00; G01N 33/0009; G01N 33/24; G01N 33/49; G01N 33/54326; G01N 33/566; G01N 33/6803; G01N 21/85; G01N 27/124; G01N 27/30; G01N 29/245; G01N 29/4409; G01N 33/343; G01N 33/5432; G01N 33/68; G01N 33/6854; G01N 21/3504; G01N 21/359; G01N 2291/0237; G01N 2291/0253; G01N 2333/43552; G01N 2333/47; G01N 2333/4703; G01N 29/227; G01N 29/2406; G01N 33/577; G01N 21/64; G01N 2333/43573; G01N 27/44791; G01N 29/42; G01N 33/0001; G01N 33/0032; G01N 33/26; G01N 33/4833; G01N 33/582; G01N 33/6872; G01N 35/08; G01N 1/405; G01N 2021/3595; G01N 21/41; G01N 21/552; G01N 21/65; G01N 2291/025; G01N 2291/101; G01N 23/2273; G01N 27/3275; G01N 31/223; G01N 33/0004; G01N 33/0022; G01N 33/30; G01N 33/483; G01N 33/487; G01N 33/5005; G01N 33/5008; G01N 2030/025; G01N 21/1702; G01N 21/7703; G01N 21/78; G01N 21/84; G01N 2291/023; G01N 2291/0231; G01N 2291/02863; G01N 25/08; G01N 27/226; G01N 29/2418; G01N 29/4454; G01N 29/4481; G01N 33/0006; G01N 33/0014; G01N 33/0019; G01N 33/1886; G01N 33/22; G01N 33/28; G01N 33/493; G01N 33/52; G01N 33/5753; G01N 9/00; G01N 9/34; G01N 1/10; G01N 1/2226; G01N 1/2273; G01N 1/24; G01N 2001/2241; G01N 2015/0038; G01N 2021/7709; G01N 2021/7786; G01N 2021/945; G01N 21/4133; G01N 21/43; G01N 21/68; G01N 27/02; G01N 27/221; G01N 33/0044; G01N 33/5302; G01N 33/537; G01N 33/551; G01N 33/56916; G01N 1/38; G01N 11/00; G01N 2021/6432; G01N 21/27; G01N 2201/06113; G01N 2291/024; G01N 2333/145; G01N 2469/20; G01N 27/225; G01N 29/11; G01N 29/226; G01N 33/0068; G01N 33/02; G01N 33/4905; G01N 33/4975; G01N 33/528; G01N 33/532; G01N 33/587; G01N 33/6812; G01N 33/946; G01N 35/00871; G01N 15/06; G01N 15/1023; G01N 2001/1037; G01N 2001/4038; G01N 2011/0073; G01N 2021/6439; G01N 21/01; G01N 21/6489; G01N 2291/02836; G01N 2333/245; G01N 2333/775; G01N 27/128; G01N 27/3278; G01N 2800/328; G01N 2800/52; G01N 29/2412; G01N 30/00; G01N 30/64; G01N 33/48707; G01N 33/5306; G01N 33/54386; G01N 33/6893; G01N 33/92; G01N 1/2205; G01N 1/28; G01N 1/30; G01N 15/01; G01N 15/02; G01N 15/0612; G01N 17/002; G01N 2001/302; G01N 2009/006; G01N 2021/6493; G01N 2030/8813; G01N 2030/884; G01N 21/17; G01N 21/643; G01N 21/6486; G01N 21/783; G01N 2223/40; G01N 2223/507; G01N 2291/011; G01N 2291/0222; G01N 2291/0251; G01N 23/2251; G01N 2333/42; G01N 2333/4724; G01N 25/48; G01N 25/66; G01N 27/06; G01N 27/301; G01N 27/64; G01N 29/04; G01N 30/56; G01N 30/7206; G01N 30/88; G01N 33/0016; G01N 33/0063; G01N 33/0073; G01N 33/554; G01N 33/57515; G01N 33/5755; G01N 33/6815; G01N 1/00; G01N 1/2214; G01N 2001/002; G01N

2015/0046; G01N 2015/0053; G01N 2021/6421; G01N 2021/7779; G01N 2030/3046; G01N 2030/8831; G01N 21/19; G01N 21/35; G01N 21/59; G01N 21/6402; G01N 2333/705; G01N 25/085; G01N 25/12; G01N 2610/00; G01N 27/041; G01N 27/223; G01N 27/302; G01N 27/3271; G01N 27/333; G01N 27/407; G01N 27/4162; G01N 27/44752; G01N 2800/32; G01N 29/28; G01N 29/346; G01N 30/04; G01N 30/28; G01N 30/60; G01N 30/96; G01N 33/0013; G01N 33/005; G01N 33/0054; G01N 33/0057; G01N 33/15; G01N 33/225; G01N 33/54388; G01N 33/56938; G01N 33/82; G01N 33/86; G01N 35/1097; G01N 1/22; G01N 13/02; G01N 15/0656; G01N 15/082; G01N 15/0893; G01N 15/1484; G01N 15/149; G01N 2001/022; G01N 2001/028; G01N 2001/2064; G01N 2015/0096; G01N 2015/1006; G01N 2015/1024; G01N 2015/1028; G01N 2021/1704; G01N 2021/1708; G01N 2021/458; G01N 2021/7776; G01N 2035/00158; G01N 21/253; G01N 21/45; G01N 21/49; G01N 21/62; G01N 2333/255; G01N 2333/916; G01N 2400/02; G01N 2400/40; G01N 25/34; G01N 27/043; G01N 27/3272; G01N 27/3276; G01N 27/4067; G01N 27/4074; G01N 27/4075; G01N 27/4076; G01N 2800/222; G01N 2800/56; G01N 29/44; G01N 30/02; G01N 30/06; G01N 30/6095; G01N 33/0059; G01N 33/006; G01N 33/0075; G01N 33/146; G01N 33/2847; G01N 33/4915; G01N 33/54313; G01N 33/557; G01N 33/56966; G01N 33/5764; G01N 33/64; G01N 33/686; G01N 33/723; G01N 33/726; G01N 33/9446; G01N 5/045; G01N 1/02; G01N 1/18; G01N 1/32; G01N 1/34; G01N 1/4022; G01N 15/0255; G01N 15/1012; G01N 2001/387; G01N 2001/4027; G01N 2011/0026; G01N 2021/258; G01N 2021/7716; G01N 2021/7723; G01N 2021/8411; G01N 2021/8416; G01N 2030/0095; G01N 2030/567; G01N 2030/8827; G01N 2035/00831; G01N 2035/0097; G01N 21/05; G01N 21/33; G01N 21/6458; G01N 21/8422; G01N 21/88; G01N 21/8806; G01N 2201/104; G01N 2203/0094; G01N 2291/02475; G01N 2291/028; G01N 2291/045; G01N 2333/4709; G01N 2333/70539; G01N 2333/70585; G01N 2333/78; G01N 2458/40; G01N 25/56; G01N 25/68; G01N 2500/00; G01N 27/005; G01N 27/021; G01N 27/028; G01N 27/27; G01N 27/28; G01N 27/307; G01N 27/4078; G01N 27/411; G01N 27/4166; G01N 27/4168; G01N 27/74; G01N 27/87; G01N 2800/105; G01N 29/024; G01N 29/046; G01N 29/14; G01N 31/222; G01N 33/0011; G01N 33/0021; G01N 33/0026; G01N 33/0052; G01N 33/0067; G01N 33/007; G01N 33/12; G01N 33/14; G01N 33/182; G01N 33/205; G01N 33/2835; G01N 33/2876; G01N 33/5082; G01N 33/536; G01N 33/544; G01N 33/56944; G01N 33/56961; G01N 33/5758; G01N 33/576; G01N 33/6896; G01N 35/00; G01N 35/00732; G01N 35/085; G01N 37/00; G01N 9/04; G01N 9/24; G01N 9/36; G01N 1/04; G01N 1/2202; G01N 1/2208; G01N 1/2211; G01N 1/286; G01N 11/162; G01N 11/167; G01N 15/0205; G01N 15/0227; G01N 15/0266; G01N 15/0272; G01N 15/075; G01N 15/10; G01N 15/14; G01N 2001/205; G01N 2001/2217; G01N 2001/2223; G01N 2001/242; G01N 2001/4016; G01N 2015/019; G01N 2015/0261; G01N 2015/0288; G01N 2015/0294; G01N 2021/495; G01N 2030/143; G01N 2030/765; G01N 2035/00237; G01N 2035/00702; G01N 21/171; G01N 21/25; G01N 21/3577; G01N 21/55; G01N 21/645; G01N 21/76; G01N 21/7746; G01N 21/8483; G01N 2201/0628; G01N 2201/12; G01N 2201/126; G01N 2201/129; G01N 2291/015; G01N 2291/0232; G01N 2291/02408; G01N 2291/02433; G01N 2291/0428; G01N 2333/185; G01N 2333/21; G01N 2333/31; G01N 2333/32; G01N 2333/811; G01N 2333/902; G01N 2333/91051; G01N 2333/91097; G01N 2333/91171; G01N 2333/95; G01N 2333/96433; G01N 2333/96438; G01N 2333/96466; G01N 25/72; G01N 2500/20; G01N 27/046; G01N 27/123; G01N 27/129; G01N 27/14; G01N 27/406; G01N 27/426; G01N 27/447; G01N 27/60; G01N 2800/04; G01N 29/045; G01N 29/343; G01N 29/48; G01N 30/16; G01N 30/76; G01N 30/8651; G01N 31/10; G01N 33/0024; G01N 33/0029; G01N 33/04; G01N 33/1833; G01N 33/5014; G01N 33/5088; G01N 33/5304; G01N 33/531; G01N 33/552; G01N 33/559; G01N 33/56922; G01N 33/56955; G01N 33/57505; G01N 33/58; G01N 33/6851; G01N 33/9413; G01N 35/00584; G01N 35/00693; G01N 35/10; G01N 7/04; G01N 9/32

See application file for complete search history.

(56) References Cited

U.S. PATENT DOCUMENTS

| | | | | |
|---|---|---|---|---|
| 11,604,131 | B2 * | 3/2023 | Farmer | G01N 15/1459 |
| 11,841,306 | B2 * | 12/2023 | Algre | G01N 15/0255 |
| 2004/0187580 | A1 * | 9/2004 | Nozaki | G01G 3/13 73/580 |
| 2009/0217759 | A1 | 9/2009 | Hiroi | |
| 2025/0130140 | A1 * | 4/2025 | Kulkarni | G01N 1/2202 |

FOREIGN PATENT DOCUMENTS

| | | | | | |
|---|---|---|---|---|---|
| KR | 102002665 | B1 | * | 10/2019 | G01N 15/0656 |
| KR | 102159941 | B1 | * | 9/2020 | G01N 15/06 |
| KR | 20250039199 | A | * | 3/2025 | G01N 15/1031 |

OTHER PUBLICATIONS

Husmann et al., "Design considerations for controlling silicon nanoparticle nucleation and growth in a northermal plasma", Plasma Chemistry and Plasma Processing, 2022, vol. 43, pp. 225-245.

Sabri et al., "Ordered monolayer gold nan-urchin structures and their size induced control for high gas sensing performance", Scientific Reports, 2016, vol. 6, Article No. 24625, Internal pp. 1-10.

International Search Report and Written Opinion for PCT/22/52629, mailed Oct. 31, 2023, 10 pages.

* cited by examiner

QUARTZ CRYSTAL MICROBALANCE IMPACTOR

CROSS-REFERENCE TO RELATED APPLICATIONS

This application is a U.S. National Phase Application of International Patent Application No. PCT/US22/52629, filed Dec. 13, 2022, which claims priority to U.S. Prov. Pat. App. No. 63/265,589, filed Dec. 17, 2021, both of which are hereby incorporated by reference in their entirety.

GOVERNMENT SUPPORT CLAUSE

This invention was made with government support under W911NF-18-1-0240 awarded by the Army Research Office (ARO). The government has certain rights in the invention.

FIELD OF THE DISCLOSURE

Described herein is a quartz crystal microbalance (QCM) impactor and method of using same. The QCM impactor is particularly useful for detecting particles at low mass concentrations, such as for semiconductor process monitoring applications.

BACKGROUND OF THE DISCLOSURE

The promotion or suppression of silicon nanoparticle formation in dilute silane plasmas is a major topic of interest within the nanomaterials field. Silicon nanoparticles have received attention in photocatalysis, optoelectronics, energy storage, and medicine. In the gas- or plasma-phase synthesis of silicon nanoparticles, some amount of precursor is lost to the reactor walls. Controlling the nucleation and growth rate of nanoparticles allows for increased particle mass yields, control over particle size, or even suppressed particle formation if particles are undesired. In the case of semiconductor processing, particle deposition onto electronic device circuit nanopatterns is highly detrimental to device performance. Given the need to further miniaturize microelectronics, particles below 10 nm in diameter are becoming "killer particles". The suppression of particle formation in these systems comes at the cost of limiting processing speed and precursor yield. As such, the ability to suppress particle formation while promoting film growth or etching is of great benefit.

A multitude of techniques have been reported to reduce particle inclusions in thin films. Methods used to prevent existing particles from reaching a film surface include increasing the volumetric flowrate through the plasma reactor to sweep out particles and particle removal from the aerosol phase via thermophoresis. Plasma pulsing has also been shown to be capable of reducing particle formation and/or removing electrostatically trapped particles. Hydrogen dilution is often performed to improve film quality and it has also been shown to inhibit particle formation. As a side effect, hydrogen dilution can also decrease film deposition rates. Despite these techniques, particle contamination remains a significant problem and is made more challenging by the need to detect particles less than 10 nm in diameter to meet current process requirements. Methods of in-situ detection of small densities of particles less than 10 nm in diameter are required to ensure that state-of-the-art semiconducting processing reactors operate at acceptably low levels of dust contamination.

A variety of commercially available instruments can be used for the in-situ detection and quantification of aerosol nanoparticles including: scanning mobility particle sizers (SMPSs), electrical low pressure impactors (ELPIs), and microorifice uniform deposit impactors (MOUDIs). These devices are well suited for sampling aerosols at atmospheric pressure where gas density is high, and ELPIs can even detect particles below 10 nm in diameter. However, most semiconductor processing reactors and low temperature plasma reactors operate under vacuum at pressures in the range $10^{-3}$ to 10 mbar. Alternative diagnostic methods suitable for atmospheric or vacuum sampling include optical particle spectrometers (OPCs) and aerosol mass spectrometers (AMSs). OPCs are suitable for detecting particles above 70 nm in size, and AMSs can detect particles down to 10 nm in size. Although each of these devices are powerful, techniques to detect low concentrations of aerosol particles below 10 nm in size under vacuum conditions are needed. This disclosure presents a QCM impactor capable of such a task. Although size information cannot be obtained from the tool reported herein, there are significant benefits of using a single impaction stage including: high mass resolution, high mass sensitivity, low capital expenditure compared to other instruments, and low operating expenses. Furthermore, for applications such as monitoring dust contamination in microelectronic processing reactors, size information is not important since often the goal is simply to have no particles at all, or more specifically, have the mass density of the aerosol below a certain value defined by the process quality control constraints. As a display of the capabilities of this QCM impactor, the present disclosure explores silicon nanoparticle nucleation from silane in a low temperature plasma reactor and gleans new insights into the role of diffusion in that process.

Despite the number of studies related to the nucleation and formation of silicon nanoparticles in dilute silane plasmas, little focus has been given to suppressing or promoting particle formation by exploiting the diffusive transport of reactive silyl species. Particle densities in a parallel plate plasma reactor have been studied at two different electrode spacings; however, the effect of electrode spacing on particle mass density was unclear. It has been demonstrated that particle formation can be suppressed by increasing the Brownian diffusion of reactive species via increasing the bulk gas temperature.

In this disclosure, a QCM impactor was developed to study the effects of tube diameter, reactor pressure, and gas composition on particle formation (presented as a mass density of particles leaving the plasma reactor). Decreasing the system size, by decreasing the discharge tube diameter, inhibits particle formation as reactive species diffuse shorter distances on average to be lost to the reactor walls. Diffusion coefficients are known to be inversely proportional to pressure, so to corroborate the claim, it was shown that increasing pressure can also promote particle formation by suppressing diffusive losses to the reactor walls. As hydrogen is known to inhibit particle growth, hydrogen content in the reactor inlet was also varied to determine if the effects of hydrogen content and tube diameter/operating pressure are cumulative.

BRIEF DESCRIPTION OF THE DISCLOSURE

In one embodiment, the present disclosure is directed to a quartz crystal microbalance (QCM) impactor comprising an orifice tube comprising an orifice nozzle, a QCM sensor, and optionally a shutter, wherein the QCM impactor is configured to deliver particles towards a detection position of the QCM sensor.

In another embodiment, the present disclosure is directed to a method of using a quartz crystal microbalance (QCM) impactor comprising an orifice tube comprising an orifice nozzle, a QCM sensor, and optionally a shutter, wherein the QCM impactor is configured to deliver particles towards a detection position of the QCM sensor, the method comprising (i) flowing a process gas comprising particles through the orifice tube and the orifice nozzle, (ii) delivering the process gas comprising particles from the orifice nozzle to the QCM sensor, and (iii) quantifying a mass of the particles in the process gas.

DETAILED DESCRIPTION OF THE DISCLOSURE

Figure 1A:
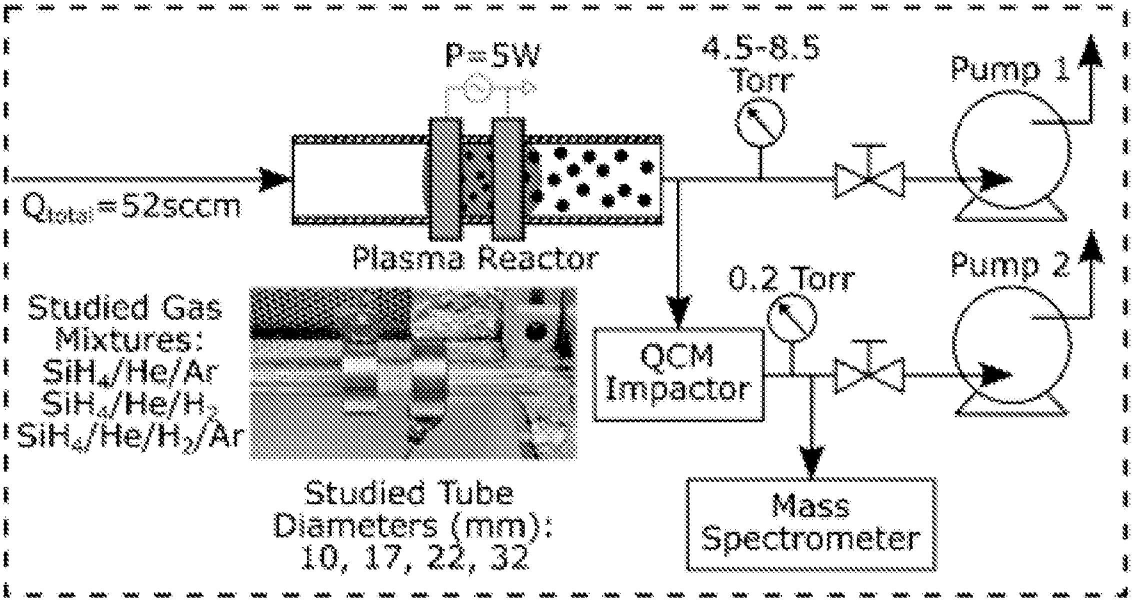
FIG. 1A is an exemplary embodiment of a schematic of the experimental apparatus in accordance with the present disclosure.

Described herein is a quartz crystal microbalance (QCM) impactor, comprising an orifice tube comprising an orifice nozzle, a QCM sensor, and optionally a shutter. The QCM impactor is configured to deliver particles towards a detection position of the QCM sensor.

In some embodiments, the QCM impactor consists of an orifice tube comprising an orifice nozzle, a QCM sensor, and optionally a shutter.

In many embodiments, the QCM impactor is configured to prevent spreading of particles to less sensitive areas of the QCM sensor. By preventing spreading, particles are impacted near a detection position, thereby increasing sensitivity. As used herein, the detection position is the location on the QCM sensor where the sensitivity is maximum.

In some embodiments, the QCM impactor is configured to deliver particles within a distance of the detection position such that the sensitivity is about 95%, 90%, 85%, 80%, 75%, 70%, 65%, 60%, 55%, 50%, 45%, 40%, 35%, 30%, 25%, 20%, 15%, or 10% of the maximum sensitivity.

In some embodiments, the detection position is located at the center of the QCM sensor. In some embodiments, the detection position is located at a position that is off-center of the QCM sensor.

In some embodiments, the QCM impactor is configured to deliver particles within a distance of about 50% of the detection radius of the QCM sensor relative to the detection position of the QCM sensor. In some embodiments, the QCM impactor is configured to deliver particles within a distance of about 30% of the detection radius of the QCM sensor relative to the detection position of the QCM sensor.

In some embodiments, a distance between the orifice nozzle and the QCM sensor is configured to prevent spreading of particles to less sensitive areas of the QCM sensor.

In many embodiments, the orifice nozzle does not comprise an array of orifices. In some embodiments, the orifice nozzle comprises one orifice. In some embodiments, the orifice nozzle comprises an orifice of a calculated diameter configured to achieve choked flow. In some embodiments, flow through the orifice is less than or equal to about 10% of the upstream process flowrate.

In some embodiments, the orifice nozzle comprises an orifice having a diameter in a range of from about 10 μm to about 1 mm. In some embodiments, the orifice nozzle comprises an orifice less than or equal to about 150 μm in diameter.

In many embodiments, a distance between the orifice nozzle and the QCM sensor is limited to prevent spreading of the particle beam to less sensitive areas of the QCM crystal. In some embodiments, a distance between the orifice nozzle and the QCM sensor is less than or equal to about 1 centimeter. In some embodiments, a distance between the orifice nozzle and the QCM sensor is less than or equal to about 1 millimeter.

In some embodiments, a ratio between a diameter of the orifice and a distance between the orifice nozzle and the QCM sensor is less than about 1:100. In some embodiments, a ratio between a diameter of the orifice and a distance between the orifice nozzle and the QCM sensor is in a range of from about 1:50 to about 1:100.

In many embodiments, the QCM impactor is configured to operate at a pressure below atmospheric pressure. In some embodiments, the QCM impactor is configured to sample gas containing particles from a system at a pressure in a range of from about $10^{-3}$ to $10^{3}$ mbar. In some embodiments, the QCM impactor operates at a pressure less than 100 mbar. In some embodiments, a pressure below atmospheric pressure is achieved by use of a pump.

In some embodiments, the QCM sensor is modified to optimize sensitivity in a small circle in the center of the crystal surface. In some embodiments, the QCM sensor comprises a modified electrode pattern and/or thickness. In some embodiments, the QCM sensor comprises an increased electrode thickness relative to a conventional QCM sensor. In some embodiments, the QCM sensor comprises a decreased electrode radius relative to a conventional QCM sensor.

In some embodiments, the QCM sensor comprises a deposited pattern of metal for the purpose of measuring the resonance frequency of a crystal in a specified location. In some embodiments, the QCM sensor comprises a deposited pattern of gold for the purpose of measuring the resonance frequency of a crystal in a specified location. The sensitivity may be enhanced by optimizing the pattern of the gold deposited on the crystal.

In some embodiments, the gold pattern has a circle at the center of the crystal approximately 1 to 10 mm in diameter. In some embodiments, the gold pattern is polygonal. In some embodiments, the location of the gold pattern is eccentric. In many embodiments, the gold pattern is deposited such that electrical contact can be made to an external circuit for the purpose of measuring the resonance frequency of the crystal.

In many embodiments, the QCM sensor is configured to quantify particles selected from nanoparticles, microparticles, plasma dust particles, and any particles that may be present in deposition, etching, implantation, or bonding processes. In some embodiments, these particles comprise a material selected from carbon, silicon, germanium, tin, boron nitride, aluminum nitride, gallium nitride, indium nitride, aluminum phosphide, gallium phosphide, indium phosphide, aluminum arsenide, gallium arsenide, indium arsenide, aluminum antimonide, gallium antimonide, indium antimonide, zinc oxide, zinc sulfide, zinc selenide, zinc telluride, cadmium oxide, cadmium sulfide, cadmium selenide, cadmium telluride, mercury oxide, mercury sulfide, mercury selenide, mercury telluride, aluminum metal, copper metal, silver metal, gold metal, nickel metal, palladium metal, platinum metal, cobalt metal, rhodium metal, iridium metal, titanium metal, tungsten metal, tantalum metal, niobium metal, molybdenum metal, titanium oxide, strontium titanate, barium titanate, zirconium oxide, hafnium oxide, tantalum oxide, tungsten oxide, molybdenum sulfide, molybdenum selenide, calcium nitride, magnesium nitride, strontium nitride, sodium fluoride, cerium oxide, aluminum oxide, gallium oxide, indium oxide, tin-doped indium oxide, tin oxide, fluorine-doped tin oxide, antimony-doped tin oxide, aluminum-doped zinc oxide, iron pnictides, iron oxide, samarium cobalt, neodymium iron boride, dysprosium-doped neodymium iron boride, iron metal, iron cobalt alloys, stainless steel alloys, aluminum alloys, nickel super alloys, Inconel, lithium nickel manganese cobalt oxides, carbon-lithium composites, iron phosphates, tin sulfide, tin selenide, antimony sulfide, antimony selenide, vanadium oxide, yttrium stabilized zirconium oxide, diamond phase carbon, boron carbide, silicon carbide, silicon oxide, silicon nitride, and combinations thereof.

In some embodiments, the QCM sensor is configured to quantify particles comprising a diameter less than or equal to about 10 nm. In some embodiments, the QCM sensor is configured to quantify particles comprising a diameter in a range of from about 10 nm to about 1000 nm. In some embodiments, the QCM sensor is designed to quantify particles in a range of from about 1 micrometer to about 20 micrometers.

Generally, the QCM impactor according to the present disclosure may be used according to any suitable method known in the art. In some embodiments, the QCM impactor is used according to a method comprising (i) flowing a process gas comprising particles through the orifice tube and the orifice nozzle; (ii) delivering the process gas comprising particles from the orifice nozzle to the QCM sensor; and (iii) quantifying a mass of the particles in the process gas by measuring a resonance frequency change of the crystal comprising the QCM sensor.

In some embodiments, the particles in the process gas are quantified as a mass density. The mass density is determined by dividing the mass of particles deposited on the QCM sensor by the volume of gas passed through the orifice nozzle while depositing those particles. In many embodiments, the mass of particles is determined from the change in resonance frequency of the crystal comprising the QCM sensor.

In some embodiments, the process gas supplied to the QCM sensor is a gas in an industrial process selected from semiconductor processes, particle formation processes, particle monitoring processes, particle synthesis processes, material deposition processes, material etching processes, pulsed laser deposition processes, sputter deposition processes, ion implantation processes, chemical vapor deposition processes, plasma-enhanced chemical vapor deposition processes, atomic layer deposition processes, plasma-enhanced atomic layer deposition processes, atomic layer etching processes, reactive ion etching processes, thermal annealing processes, thermal oxidation processes, plasma etching processes, photoresist exposure processes, direct laser write processes, molecular beam epitaxy processes, wafer bonding processes, x-ray photoelectron spectrometers, transmission electron microscopes, scanning electron microscopes, atomic force microscopes, scanning probe microscopes, scanning tunneling microscopes, plasma cleaning processes and combinations thereof.

In some embodiments, when the QCM impactor comprises a shutter, the QCM impactor makes measurements of particle mass in the process gas when the shutter is open and does not make measurements of particle mass in the process gas when the shutter is closed.

EXAMPLES

Without further elaboration, it is believed that one skilled in the art using the preceding description can utilize the present disclosure to its fullest extent. The following Examples are, therefore, to be construed as merely illustrative, and not limiting of the disclosure in any way whatsoever.

Example 1. Methods

To deconvolute the effects of pressure, reactor tube diameter, hydrogen content, and the silane fraction fed into the plasma reactor, experiments were performed under one of two sets of conditions: constant pressure, and constant reactor tube diameter. For each of these cases, hydrogen content and the silane fraction were both varied, however, the total molar flowrate was kept constant for all experiments. Particles generated from the plasma reactor for each condition were detected by the QCM impactor.

Figure 1B:
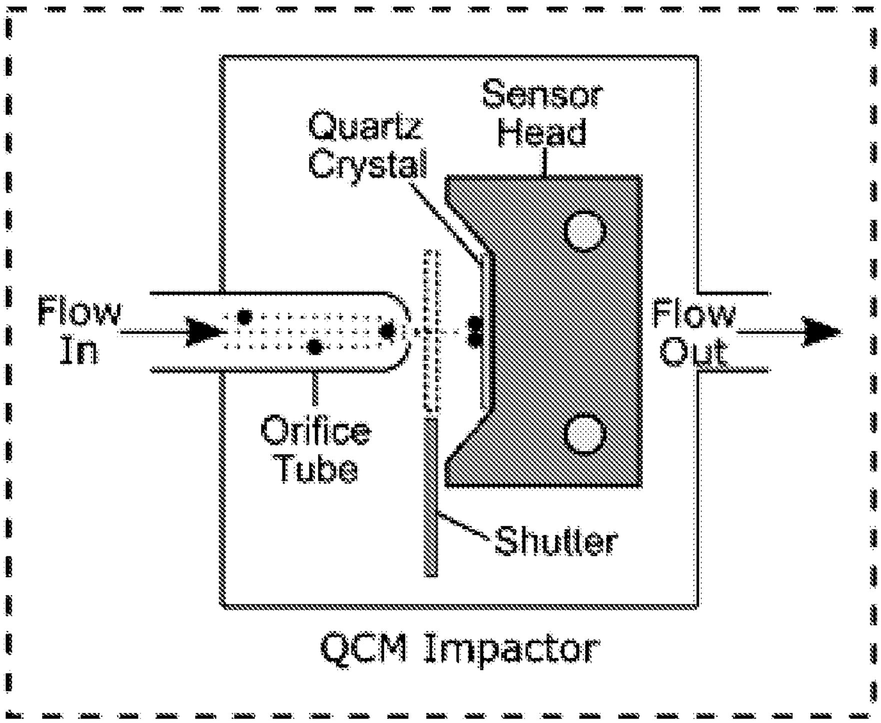
FIG. 1B is an exemplary embodiment of a diagram of the QCM impactor in accordance with the present disclosure.

The primary components of the experimental setup are the tubular plasma reactor and the QCM impactor, illustrated in FIGS. 1A-1B. The plasma reactor is a 10-inch-long fused silica tube with two ring electrodes to produce a capacitively coupled plasma (CCP). Tubes of the following inner diameters were studied: 10 mm, 17 mm, 22 mm, and 32 mm. Further details on the reactor geometry can be found in further examples. The feed gas included a precursor gas composed of 0.9% silane in helium and a balance gas of either pure argon, 10% hydrogen in argon, or pure hydrogen. The total molar flowrate, controlled by flow controllers (MKS Instruments and Bronkhorst), of the feed gas was held constant at 52 cubic centimeters per minute at standard temperature and pressure (sccm). The reactor pressure was varied from 4.5 to 8.5 Torr by using a valve. An RF (13.56 MHz) AG0163 power supply with an AIT600 matching network (T&C Power Conversion) was used to supply the plasma reactor with 5W of power. It was decided to operate using constant plasma power for all conditions due to the complex effects of varying power on plasma parameters. Ideally, average plasma parameters, e.g., electron temperature, ion density, and bulk gas temperature, would be kept constant for all studied conditions; however, the measurement and maintenance of these parameters was well beyond the scope of this disclosure. The measurement of plasma parameters for a silane plasma using Langmuir probe techniques is made more challenging due to silicon fouling on the probe tips.

Downstream of the reactor, gas was diverted to the QCM impactor. The amount of gas diverted was not held constant due to the varied reactor pressure and chemical composition. A 150 μm diameter orifice tube (Lenox Laser) was used to impact particles onto the quartz crystal (Telemark, part number 880-0201-3). Molar flowrates to the QCM were determined using software provided by the orifice manufacturer. The pressure downstream of the orifice was held at 0.2 Torr.

Under the studied conditions, all particles, irrespective of size, are expected to impact onto the quartz crystal since the critical cutoff diameter of impaction, $d_{p,c}$, was always less than 1 Å (much smaller than any critical cluster size). Thus, the QCM measures the total aerosol mass current in the sample stream. The cutoff diameter of impaction can be determined using the following equation:

$$d_{p,c} = \left(\frac{9\pi\mu D_o^3 Stk_c}{4\rho_p Q C_c(P)}\right)^{0.5} \quad (1)$$

where μ is the dynamic viscosity of the gas, $D_o$ is the diameter of the orifice, $Stk_c$ is the critical Stokes number (0.24 for a circular orifice), $\rho_p$ is the density of the particle, Q, is the volumetric flowrate through the orifice, and $C_c(P)$ is the Cunningham slip correction factor, which is dependent on pressure. Particles were assumed to stick to the QCM surface since the particles were small (<10 nm) and thus the particles had a smaller kinetic energy in comparison to the adhesion energy. Particle size was verified using a transmission electron microscope (TEM), and results can be found in further examples. To maintain constant impaction conditions, the orifice was cleaned between experiments via sonification in water for 5 minutes followed by blasting with pressurized air. The orifice was subsequently dried in a desiccator oven.

The quartz crystal was held by a sensor head (Telemark) equipped with a shutter. The resonance frequency of the quartz crystal was monitored using an OSC-100 oscillator (Inficon) and an FTM-2400 quartz crystal monitor (Kurt J. Lesker). The change in resonance frequency of the quartz crystal can be converted into a mass loading by using the Sauerbrey equation:

$$\Delta m = -\Delta f\left(\frac{A\sqrt{\rho_q \mu_q}}{2f_o^2}\right) \quad (2)$$

where Δm is the change in the mass loading of the quartz crystal, Δf is the change in the quartz crystal resonance frequency, A is the effective crystal area, $\rho_q$ is the density of the quartz crystal (2.65 g $cm^{-3}$), $\mu_q$ is the shear modulus of the quartz crystal ($2.95 \cdot 10^{11}$ $g \cdot cm^{-1} \cdot s^{-2}$), and $f_o$ is the resonant frequency of the fundamental mode of the quartz crystal (6 MHz). To avoid overloading, the quartz crystal was replaced whenever Δf>40 Hz from its original value. The sampling procedure for the QCM impactor went as follows: plasma ignition, opening the QCM shutter after 10 seconds, particle sampling for up to 120 seconds, closing the QCM shutter, then turning the plasma off. Deposition rates were determined by fitting the linear response of the QCM. Deposition rates were then converted into particle mass densities by normalizing the deposition rates by the volumetric flowrate to the QCM.

Since particles are impacted onto a small area on the center of the crystal, the determined mass loading is expected to be overestimated by a constant factor if the effective crystal area is assumed to be the area of the overlapping electrodes on the quartz crystal (33 $mm^2$). This overestimation is due to the quartz crystal having a radially dependent mass sensitivity, with a maximum sensitivity at the radial center. To account for this effect, the sensitivity of the QCM was determined as a function of radial distance from the center of the quartz crystal, r. To perform this calibration, a 200 ng/L solution of <25 nm $TiO_2$ nanoparticles (Sigma-Aldrich, catalog number 637254) in deionized water (18.2 MΩ·cm) was prepared. QCM sensitivity as a function of r was determined by depositing 0.2 μL of the prepared solution at various locations for a series of quartz crystals. The water was left to evaporate at atmospheric conditions for 6 minutes, leaving behind a deposit of $TiO_2$ nanoparticles of a known mass. QCM sensitivity was then calculated as the change in the quartz crystal resonance frequency over the mass loading. The positions of the deposits were measured from digital images of the quartz crystals. To avoid depositing over existing deposit and to simplify image processing, up to 4 depositions were performed in a line for each quartz crystal.

Downstream of the QCM impactor, an XT300 quadruple mass spectrometer (ExTorr Inc.) was used to determine the amount of reacted silane. Ionization of the gas molecules was performed via electron impaction using an electron energy of 70 eV and a current of 2 mA. The m/z=31 peak (corresponding to the mass-to-charge ratio of silane) was normalized by the m/z=4 peak (corresponding to helium) to account for small fluctuations of the reactor pressure upon plasma ignition and extinguishment, which directly affected the amount of flow to the mass spectrometer.

Two main tasks were performed: validation of the QCM impactor and determination of the effects of system parameters on particle formation. Verification of the QCM impactor included verifying that the QCM can detect the onset of particle formation and QCM calibration to accurately relate the QCM response to a mass loading. Upon verification of the QCM impactor, determination of the effects of pressure, hydrogen content, reactor tube diameter, and the silane fraction at the reactor inlet on particle formation was achieved.

Example 2. Verification of the QCM Impactor

Figure 2:
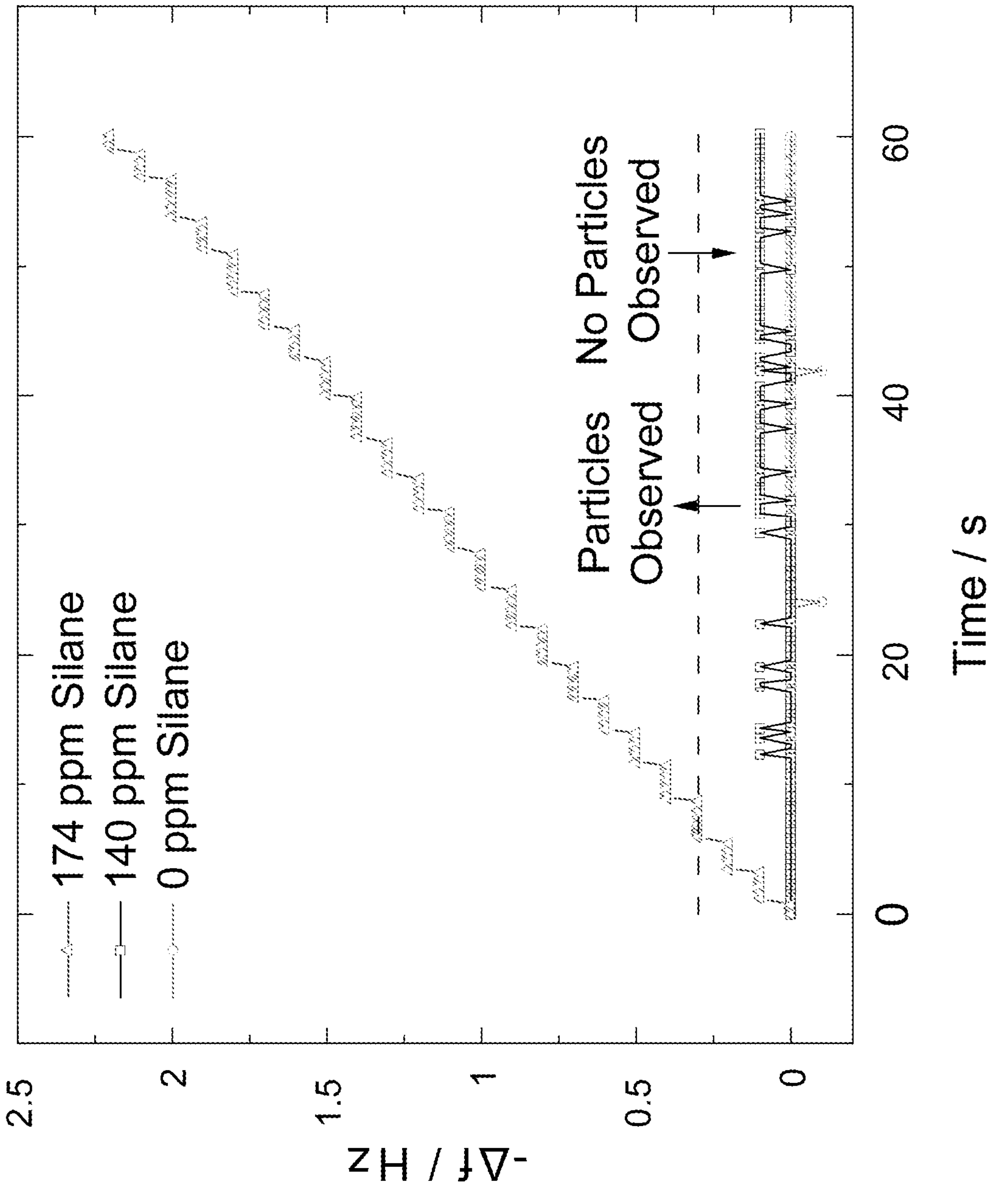
FIG. 2 is an exemplary embodiment of the change in the quartz crystal resonance frequency over time for various molar fractions of silane fed into the plasma reactor in accordance with the present disclosure. The following parameters were used: reactor pressure: 6.5 Torr, tube diameter: 17 mm, and balance gas: pure Ar.

Preliminary validation of the QCM impactor, and the idea of a nucleation threshold silane inlet fraction, was performed by tracking Δf over time while varying the fraction of silane fed into the plasma reactor around the nucleation threshold, as shown in FIG. 2. The expectation is that below the particle nucleation threshold, no mass deposition will be observed, as evidenced by negligible change in the sensor resonance frequency; and above the threshold, a disproportionately large linear slope will be observed when compared to the silane inlet fraction below threshold. Very little to no particle deposition was observed up to a reactor inlet silane fraction of 140 ppm; however, particle deposition was clearly observed at a silane inlet fraction of 174 ppm, which can be seen in the linear shift of the quartz crystal resonance frequency that is larger in magnitude than the digital noise floor. This result builds confidence in the concept that a minimum silane concentration at the reactor inlet is required for particles to nucleate and be detected, which is an idea that has enjoyed success in other systems. Since the resolution of the QCM is 0.1 Hz and instrumental drift is low (<0.1 $Hz \cdot min^{-1}$), particles were said to be observed if $$\frac{\Delta f}{\Delta t} > 0.3$$

$Hz \cdot min^{-1}$. The reactor inlet silane fraction required to satisfy this criterion is henceforth defined as the nucleation onset fraction. Although this definition ignores potential particle losses upstream of the QCM, measurement of the nucleation onset fraction as a function of system parameters still allows determinations to be made of how to promote or suppress particle formation.

Figure 3:
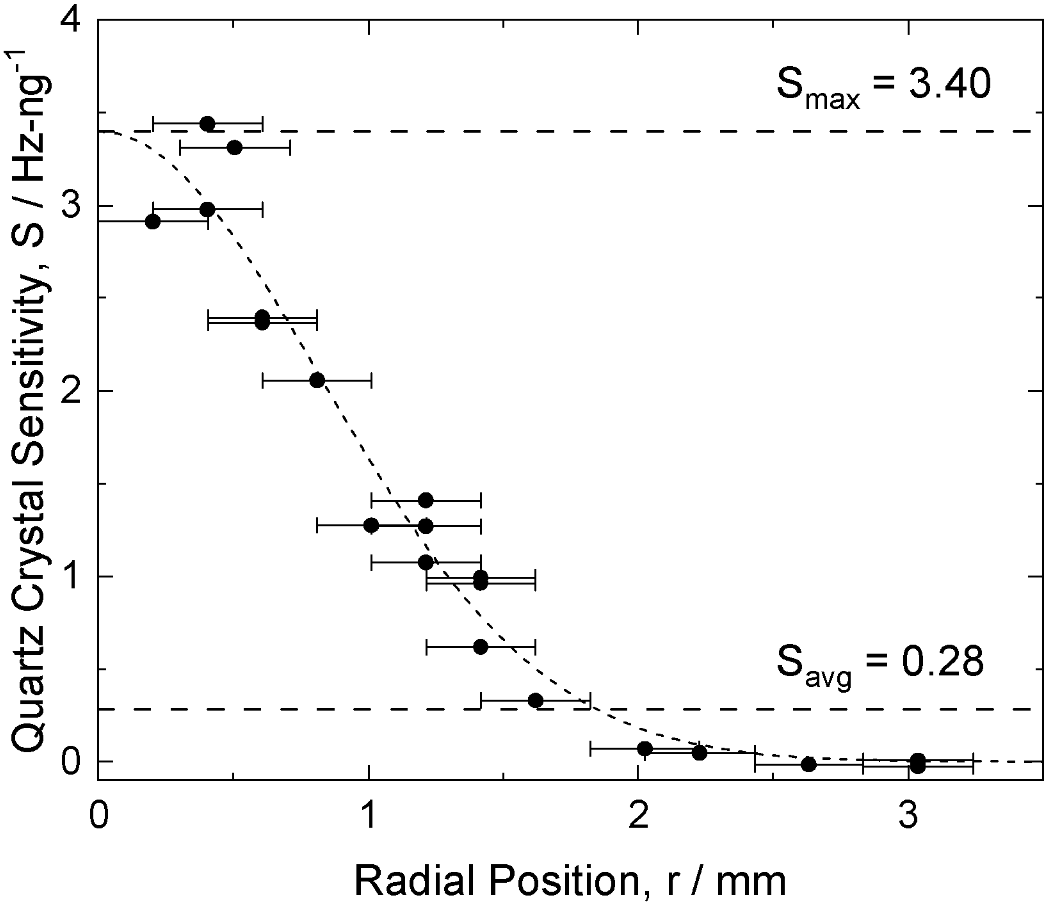
FIG. 3 is an exemplary embodiment of the sensitivity of the quartz crystal, S, as a function of radial position, r, in accordance with the present disclosure. The dotted line represents the fit given by Equation 3, and the error bars represent the area over which the deposit was spread. The maximum and area averaged sensitivities are provided.

To accurately relate the change in frequency of the QCM to a mass loading, Quartz crystal sensitivity (defined as $-\Delta f/\Delta m$) as a function of r was determined as shown by FIG. 3. Derived Bessel functions and modified Bessel functions have been shown to accurately model the radially-dependent vibrational response of planar quartz crystals; however, Equation 3, an empirical relationship reported in the literature, provided a more accurate description of the data. A comparison of the two models can be found in further examples.

$$S = S_{max}\exp\left(-\beta r^2\right) \tag{3}$$

$S_{max}$ represents the maximum sensitivity of the quartz crystal (where r=0), and β is an empirical constant which describes the width of the sensitivity distribution. Values for $S_{max}$ and β were determined to be 3.40 Hz $ng^{-1}$ and 0.73 $mm^{-2}$ respectively. The area-averaged sensitivity of the quartz crystals was determined to be 0.28 Hz $ng^{-1}$ using Equation 4:

$$S_{avg} = \frac{1}{\pi r_0^2}\int_0^{r_0} 2\pi r S_{max}\exp\left(-\beta r^2\right)dr \tag{4}$$

where $r_0$ is the radius of the exposed quartz crystal (4.05 mm). From taking the ratio of $S_{max}$ to $S_{avg}$, sensitivity of the quartz crystal is increased by a factor of 12 when depositing on the center of the studied quartz crystals rather than over the entire area. These sensitivities can also be converted into a minimum mass deposition rate required for detection by the QCM impactor of about 1056 $pg \cdot min^{-1}$ when depositing over the entire exposed quartz crystal area and 88 $pg \cdot min^{-1}$ when depositing on only the center of the quartz crystal.

Example 3. The Effects of System Parameters on Particle Formation

Figure 4A:
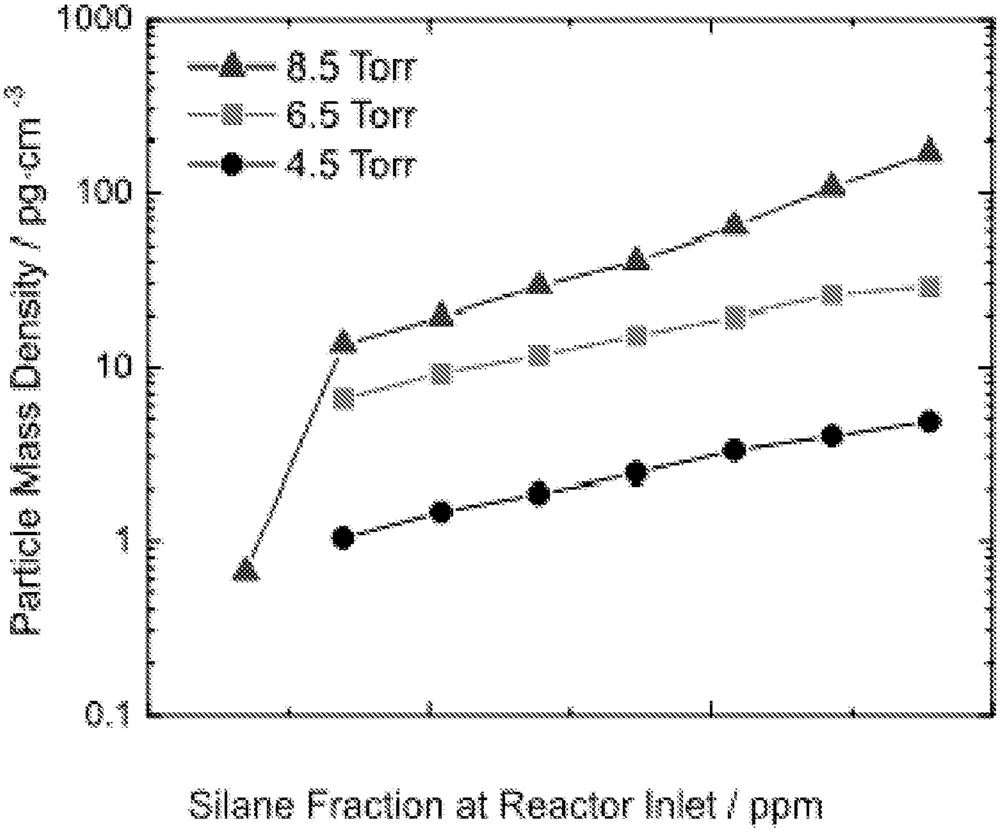
FIG. 4A is an exemplary embodiment of the particle mass density as a function of the silane fraction fed into the plasma reactor for various pressures given a balance gas of pure Ar in accordance with the present disclosure. Tube diameter was held constant at 17 mm.
Figure 4B:
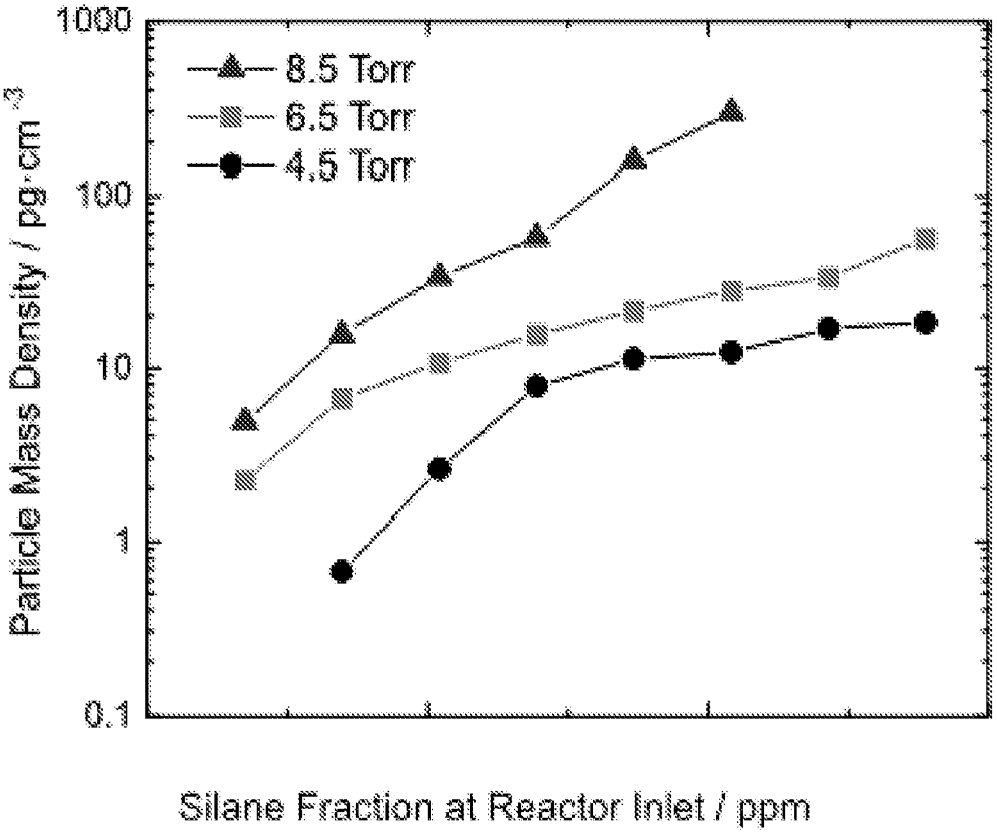
FIG. 4B is an exemplary embodiment of the particle mass density as a function of the silane fraction fed into the plasma reactor for various pressures given a balance gas of 10% $H_2$ in Ar in accordance with the present disclosure. Tube diameter was held constant at 17 mm.
Figure 4C:
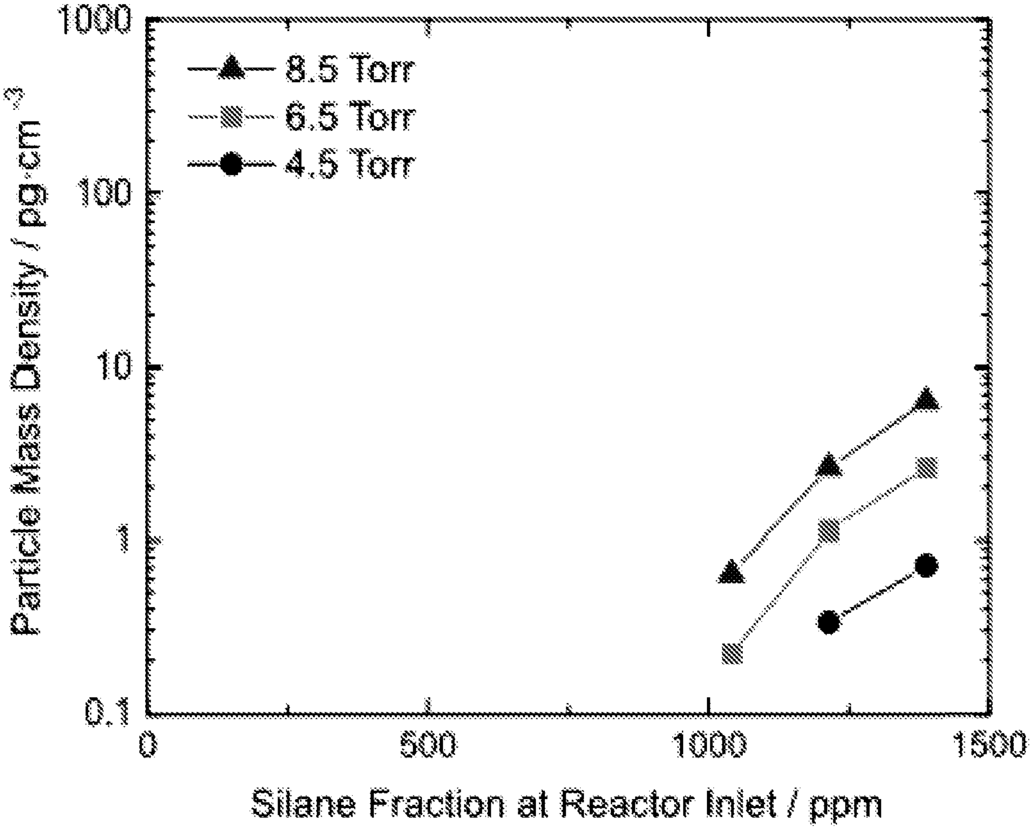
FIG. 4C is an exemplary embodiment of the particle mass density as a function of the silane fraction fed into the plasma reactor for various pressures given a balance gas of pure $H_2$ in accordance with the present disclosure. Tube diameter was held constant at 17 mm.

To eventually relate the nucleation onset fraction to experimental parameters, particle mass density (the mass deposition rate normalized by the volumetric flowrate to the QCM) was determined as a function of the silane fraction in the reactor inlet, reactor pressure, and hydrogen content, as shown in FIGS. 4A-4C. For all cases, the mass density increased with increasing silane fraction at the reactor inlet. Intuitively, as more silane was fed into the reactor, more mass can be incorporated into particles. More interestingly, as pressure was increased at the same fraction of silane at the reactor inlet, particle mass density increased for all cases. The increase in mass density of the aerosol agrees with the hypothesis that decreasing the diffusion coefficient of reactive silyl species (by increasing the pressure) promotes particle formation over film deposition. As the diffusion coefficient of reactive species is decreased and the reactor size is held constant, more silyl species are allowed to be incorporated into particles as transport to the reactor walls is limited. By the ideal gas law, increasing pressure will increase the silane mass density at the reactor inlet even if the fraction is the same; however, the pressure effects are still significant if FIGS. 4A-4C are replotted as a function of silane mass density at the reactor inlet rather than silane fraction (see FIGS. 12A-12C).

When a balance gas of 10% $H_2$ was used, shown by FIG. 4B, particle mass density generally increased compared to the pure argon case, shown by FIG. 4A. This result was surprising as hydrogen has been reported to suppress particle formation. A moderate amount of $H_2$ in the balance gas appears to be disproportionately inhibiting film formation over particle growth under the studied conditions. Hydrogen radicals can deprotonate silane and other silyl species via hydrogen abstraction, and the resultant faster reaction kinetics are expected to promote particle formation over film growth due to diffusional effects. This mechanism would require the increased rate of silane deprotonation via hydrogen radicals to be greater than the increase in conversion of reactive silyl species back into silane via hydrogen incorporation. Alternatively, a small to moderate amount of $H_2$ in the balance gas may disproportionally inhibit film formation over particle formation by reducing the number of potential reactive sites on the reactor walls. Upon increasing the hydrogen fraction from 10% $H_2$ to pure $H_2$, particle mass density in the effluent was decreased by over an order of magnitude (FIGS. 4B-4C). Clearly, particle formation is suppressed for high fractions of hydrogen in the balance gas. This effect will be later discussed in more detail.

Figure 5:
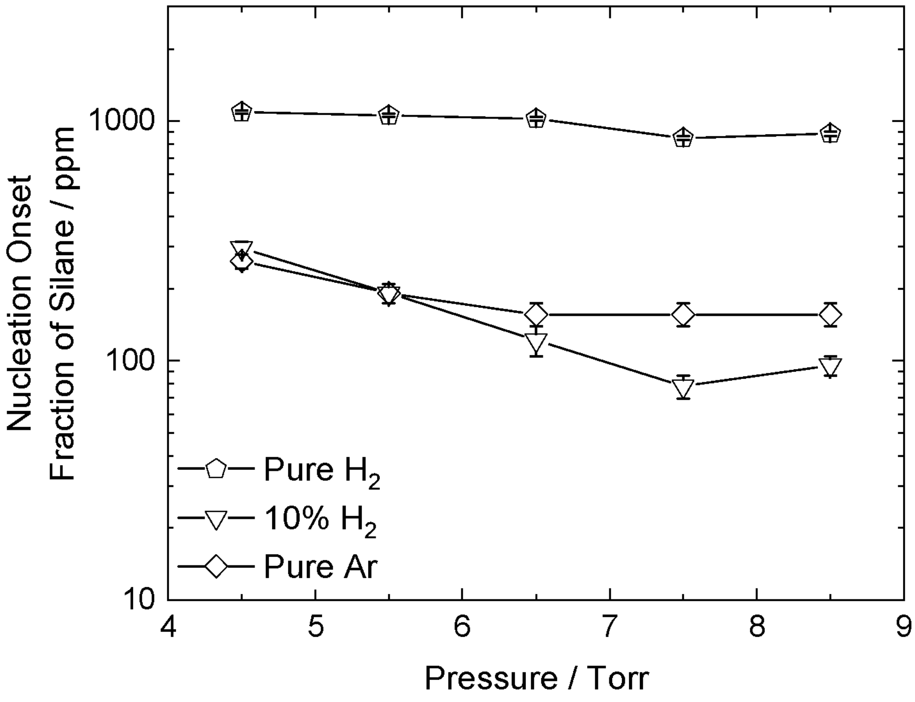
FIG. 5 is an exemplary embodiment of the nucleation onset fraction of silane as a function of reactor pressure for various balance gases in accordance with the present disclosure. The reactor tube diameter was 17 mm. The bottom and top of the error bars represent the reactor inlet silane fractions at which the measured deposition rate was below and above the nucleation threshold respectively.

Since the suppression of particle formation is vital for a variety of industrial processes, the nucleation onset fraction was measured as a function of pressure and hydrogen content in the balance gas. The results are shown by FIG. 5. To reiterate, the nucleation onset fraction provides a minimum reactor inlet silane fraction past which particles are detectable with the QCM impactor. As the reactor pressure was increased, the nucleation onset fraction generally decreased. The effect of pressure was most significant when the balance gas was 10% $H_2$ where the nucleation onset fraction was reduced by a factor of 3 over a pressure range of 4.5 Torr to 8.5 Torr, but this reduction was weak considering how the increase in pressure results in an increase of the density of silane at the rector inlet by approximately a factor of 2 from the ideal gas law at constant inlet fraction. More interestingly, when a balance gas of pure $H_2$ was used, the nucleation onset fraction was much larger and nearly constant over the studied pressure range.

Figure 6:
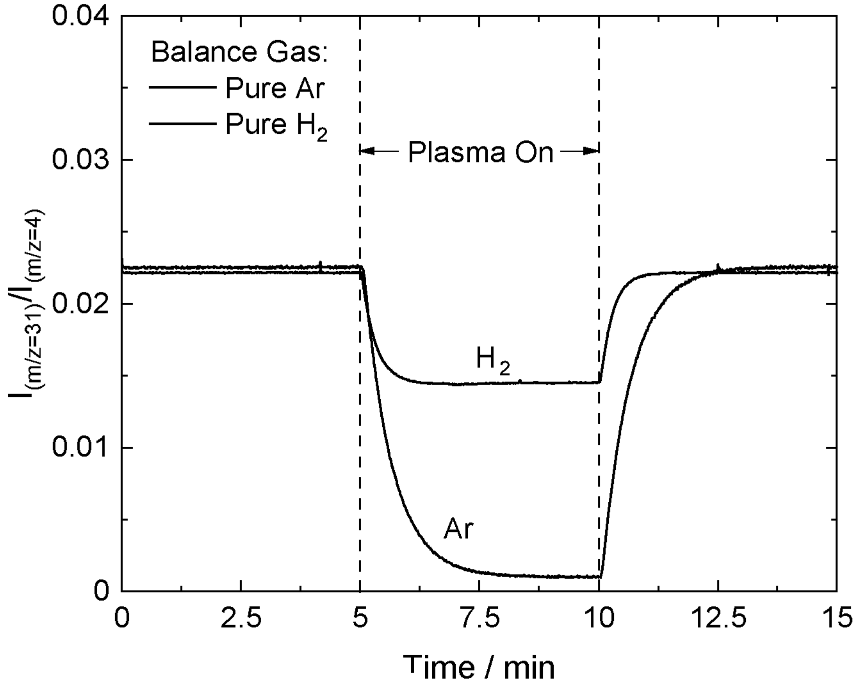
FIG. 6 is an exemplary embodiment of mass spectroscopy results showing the m/z=31 intensity (silane) over the m/z=4 intensity (helium) as a function of time given a balance gas of pure Ar or $H_2$ in accordance with the present disclosure. The reactor pressure was 6.5 Torr, and the tube diameter was 32 mm. Results for a 10 mm tube are nearly identical.

When the balance gas was switched to pure $H_2$, particle formation was greatly suppressed, as shown by FIG. 4C and FIG. 5. This result corroborates previous reports in the literature and can be explained by the suppression of silane conversion into reactive species. Mass spectroscopy was performed for verification, as shown in FIG. 6. For the pure Ar case, total silane conversion (to either particles or film) was over 95%. For the pure $H_2$ case, the total silane conversion was only 34%. As such, large gas fractions of hydrogen seem to aid in suppressing particle formation; however, there is a cost of significantly reducing silane conversion. It would be ideal to have independent control over particle formation and precursor conversion.

Figure 7A:
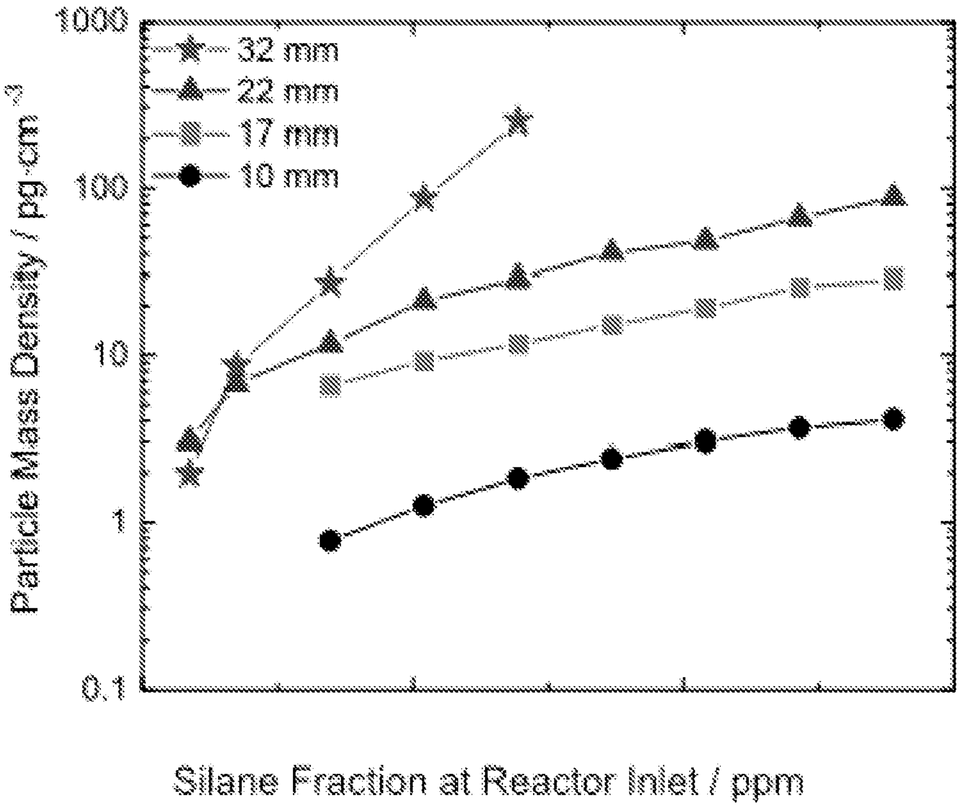
FIG. 7A is an exemplary embodiment of the mass deposition rate as a function of the reactor inlet silane fraction fed into the plasma reactor for various tube diameters given a balance gas of pure Ar in accordance with the present disclosure. Reactor pressure was held constant at 6.5 Torr.
Figure 7B:
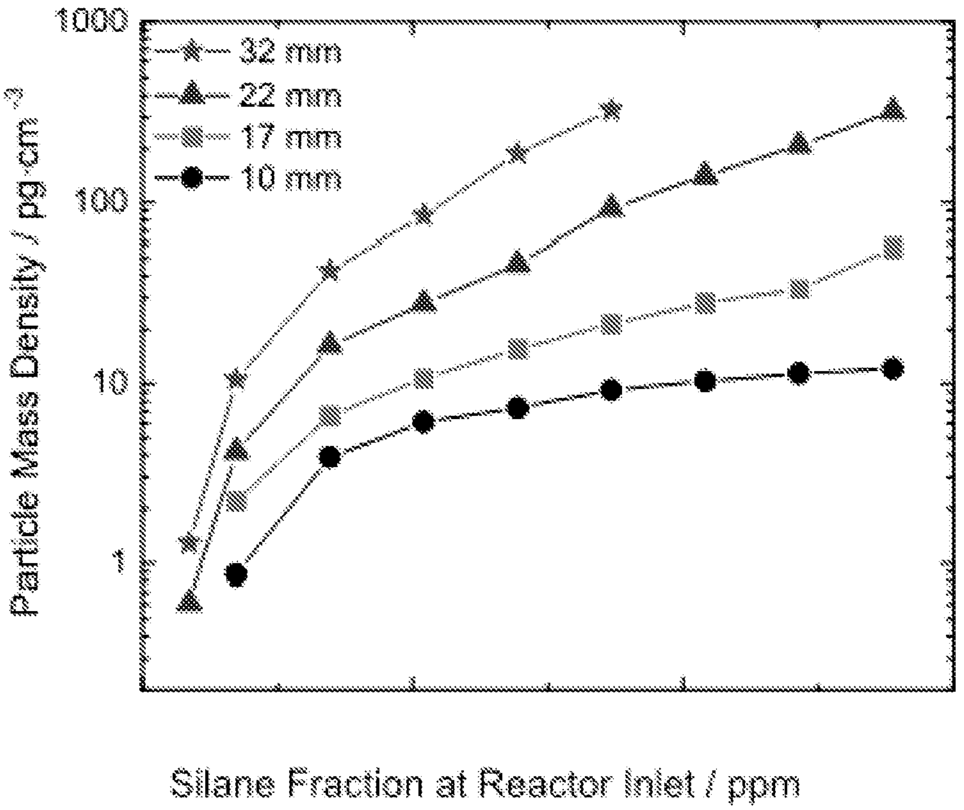
FIG. 7B is an exemplary embodiment of the mass deposition rate as a function of the reactor inlet silane fraction fed into the plasma reactor for various tube diameters given a balance gas of 10% $H_2$ in Ar in accordance with the present disclosure. Reactor pressure was held constant at 6.5 Torr.
Figure 7C:
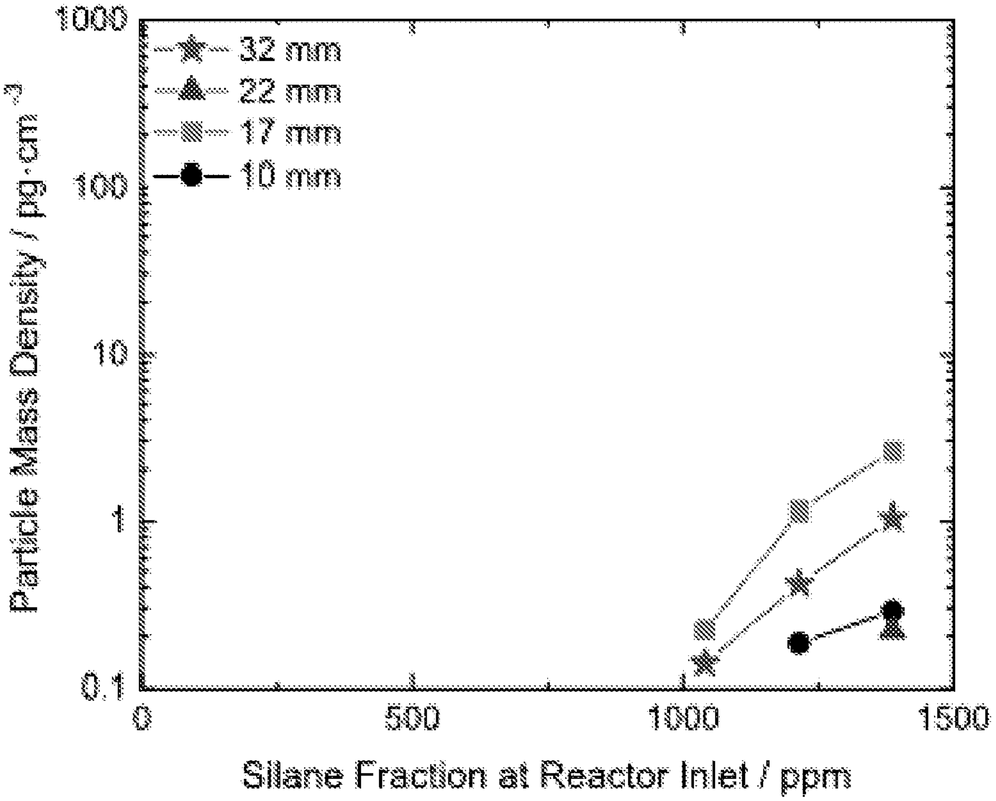
FIG. 7C is an exemplary embodiment of the mass deposition rate as a function of the reactor inlet silane fraction fed into the plasma reactor for various tube diameters given a balance gas of pure $H_2$ in accordance with the present disclosure. Reactor pressure was held constant at 6.5 Torr.

To assess how the reactor tube diameter affects particle formation, particle mass density was measured as a function of the reactor inlet silane fraction at a constant reactor pressure of 6.5 Torr for various tube diameters, as shown by FIGS. 7A-7C. Similar to FIGS. 4A-4C, particle mass density increased with increasing silane fraction at the reactor inlet for any given tube diameter. Upon increasing the tube diameter, particle mass density was increased significantly for the pure Ar and 10% $H_2$ cases (over an order of magnitude when comparing the 10 mm tube mass densities to the 32 mm tube mass densities). These experiments were carried out at constant pressure, and thus were free of artifacts due to changing silane mass density at the reactor inlet according to the ideal gas law. This result was in accordance with the original hypothesis that smaller tubes will suppress particle formation due to the decreased length reactive species must travel to reach the reactor walls. To further support the hypothesis, film deposition on the reactor walls was observed to be increased for smaller tube sizes (noted by a darker coloration on the reactor tube). Images of the reactor tubes can be found in FIG. 14.

Particle mass densities were observed to be similar when comparing the cases when the balance gas was Ar vs. 10% $H_2$ (all else kept constant); however, when the balance gas was switched to pure $H_2$, a significant decrease in particle mass densities was observed. In addition, for the pure $H_2$ case, particle mass density no longer increased with increasing tube diameter. High $H_2$ content may be lowering reaction rates such that deposition on the reactor walls is limited by kinetics rather than diffusion. This would explain why particle formation was greatly suppressed (due to the lower concentrations of reactive species) and why the tube diameter becomes less relevant. As previously discussed, high $H_2$ content can suppress both particle and film formation. As such, the potential benefit of inhibiting particle formation comes with a cost of reducing the film deposition rate.

Figure 8:
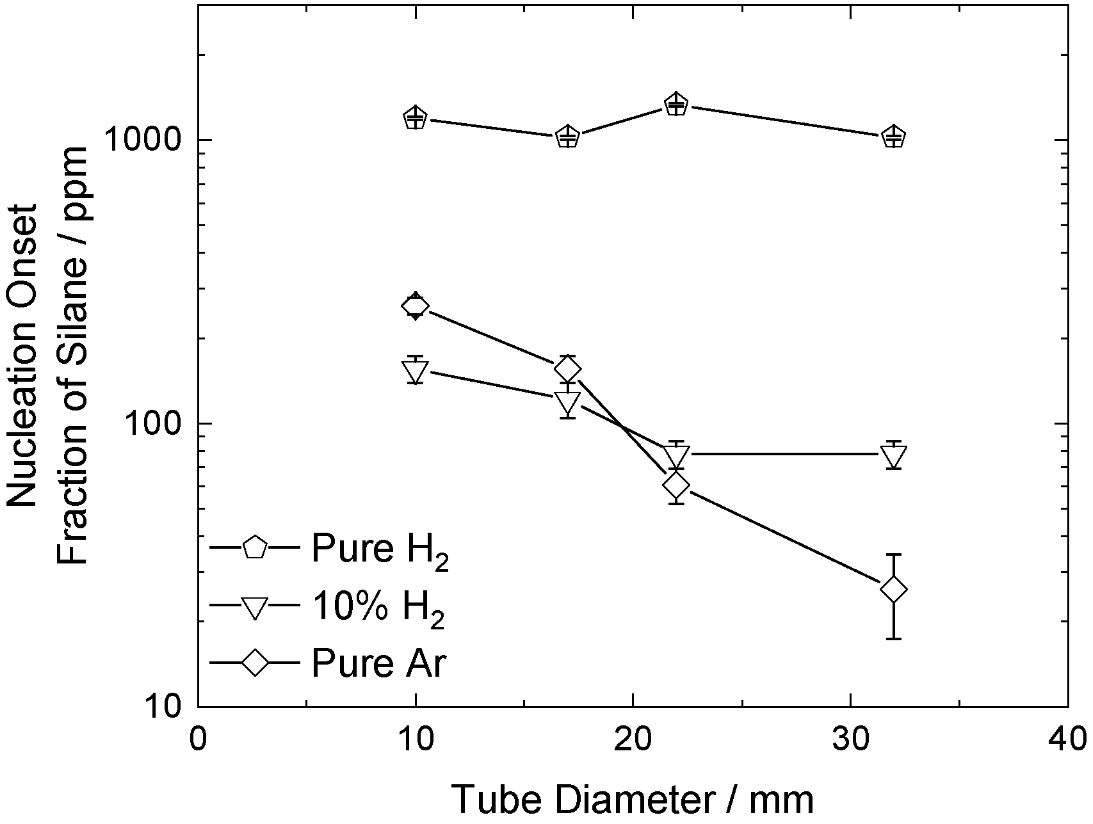
FIG. 8 is an exemplary embodiment of the nucleation onset fraction of silane as a function of reactor tube diameter for various balance gases in accordance with the present disclosure. The reactor pressure was 6.5 Torr. The bottom and top of the error bars represent the reactor inlet silane fractions at which the measured deposition rate was below and above the nucleation threshold respectively.

It is clear from FIGS. 7A-7C how increasing reactor tube diameter can greatly increase particle mass density when the background gas is Ar and be largely independent of particle mass density when the background gas is $H_2$; however, it is not immediately clear how the nucleation onset fraction of silane will be affected. As such, it is useful to describe the nucleation onset fraction of silane as a function of reactor parameters for applications which focus on inhibiting particle formation. FIG. 8 compares the nucleation onset fraction as a function of tube diameter given a balance gas of pure Ar, 10% $H_2$, and pure $H_2$. For the pure argon case, increasing the tube diameter from 10 mm to 32 mm was shown to decrease the nucleation onset fraction by over an order of magnitude. As previously stated, this result can be explained with a diffusion mechanism. Reactive species have a much smaller distance to travel for smaller reactor geometries, so film formation is promoted, and particle formation is suppressed.

Upon switching to a balance gas of 10% $H_2$, increasing the tube diameter from 10 mm to 32 mm only decreases the nucleation onset fraction of silane by a factor of 2 rather than an order of magnitude. As previously stated, hydrogen can suppress the effects of varying tube diameter by limiting reaction kinetics. This idea may suggest that the deprotonation of silyl species from hydrogen radicals was not significant compared to the insertion of hydrogen to convert reactive silyl species back into silane under the studied conditions. As such, hydrogen may generally inhibit silane conversion, but disproportionally favor particle formation or film formation depending on the specific reactor conditions.

Similar to results shown previously, the nucleation onset fraction was significantly increased when the balance gas was switched to pure $H_2$, meaning particle nucleation was suppressed. Additionally, the nucleation onset fraction appears to be largely independent from the tube diameter for this condition. Although varying $H_2$ content and varying the tube diameter appear to be useful knobs to turn for suppressing or promoting particle formation, these effects cannot be combined to suppress particle formation. Although hydrogen may be required for some deposition processes to control film crystallinity, for processes that do not require hydrogen, the use of small reactor sizes for deposition processes shows promise for inhibiting particle formation.

Example 4. Details on the Reactor Geometry

Figure 9:
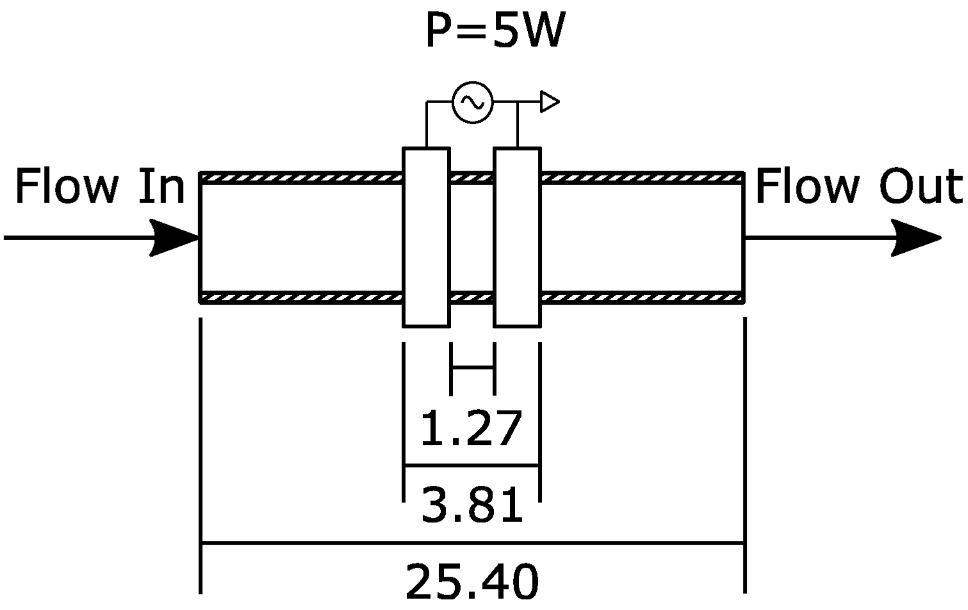
FIG. 9 is an exemplary embodiment of an illustration of a plasma reactor with the relevant dimensions in accordance with the present disclosure. Units are given in centimeters.

FIG. 9 shows a schematic of the plasma reactor. The tube wall thicknesses for the 10 mm, 17 mm, 22 mm, and 32 mm tubes were 1 mm, 1 mm, 1.5 mm, and 3 mm respectively.

Example 5. Transmission Electron Microscopy (TEM) Images

Figure 10:
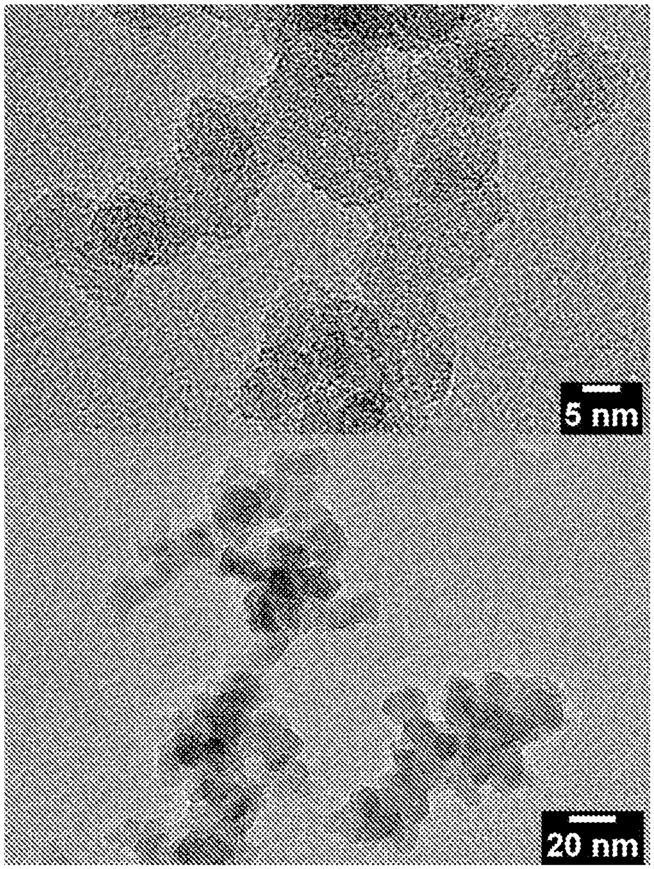
FIG. 10 is an exemplary embodiment of sample transmission electron microscopy (TEM) images of synthesized particles in accordance with the present disclosure.

Particles were synthesized using a reactor tube diameter of 32 mm, reactor pressure of 6.5 Torr, and supplied power of 5 W. The feed gas was 51 sccm of argon and 1 sccm of 0.9% silane in helium. Synthesized particles were then impacted onto a lacey carbon TEM grid using the QCM impactor. The TEM grid was lightly adhered to the top of a clean quartz crystal. TEM images were collected using a JEOL JEM-2100F Field Emission scanning transmission electron microscope at an accelerating voltage of 200 kV. Sample images are shown in FIG. 10. From a sample of 100 particles, the average particle size was about 7 nm, with a geometric standard deviation of 1.21. Synthesized particles appear to be amorphous silicon by inspection.

Example 6. Fitting the QCM Calibration Data

Figure 11:
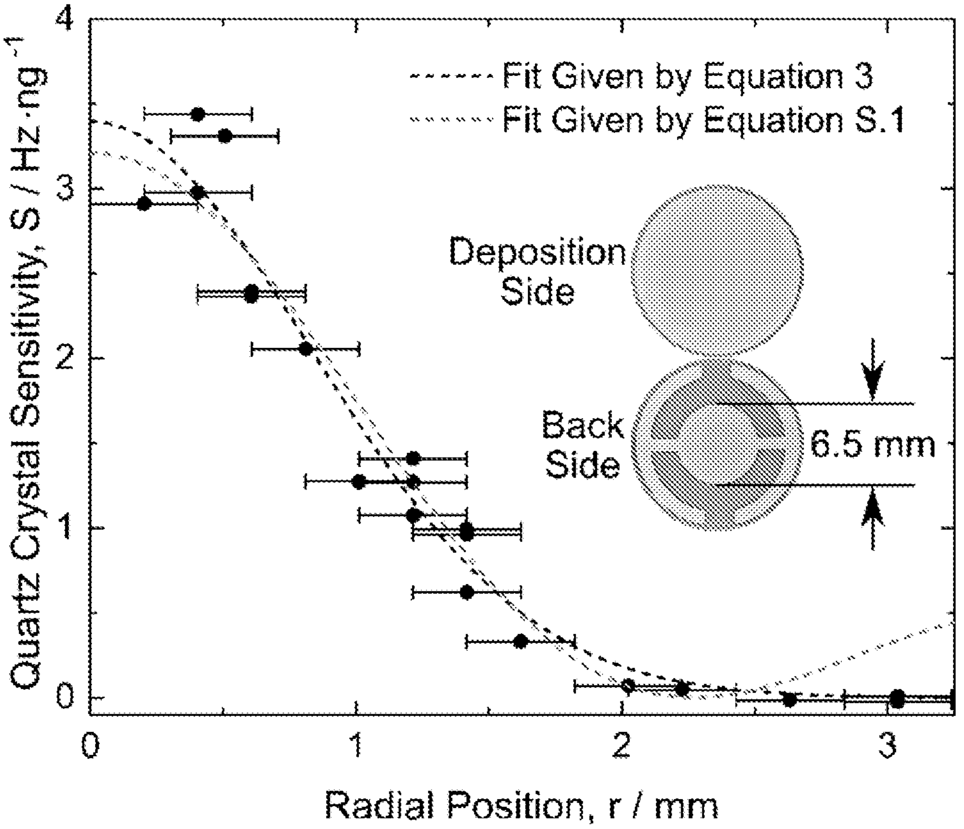
FIG. 11 is an exemplary embodiment of quartz crystal sensitivity, S, as a function of radial position, r, in accordance with the present disclosure. Fits from Equation 3 and Equation 3.1 are provided. The end of the electrode overlap region occurs at r=3.25 mm.

A derived function for the sensitivity of a planar quartz crystal within the electrode overlap region is provided by Equation 3.1:

$$S = S_{max}(J_0(\gamma r))^2 \qquad 3.4$$

where $J_o(x)$ is the zeroth order Bessel function of the first kind of x, and y is a constant. Values for $S_{max}$ and y were determined to be 3.21 Hz $ng^{-1}$ and 1.06 $mm^{-1}$ respectively via fitting. FIG. 11 compares the fit of Equation 3 and Equation 3.1 to radially dependent quartz crystal sensitivity. Equation 3 shows good agreement with the measured data; however, Equation 3.1 shows significant divergence from the experimental results at high values of r. This effect is likely due to differences between the present electrode geometry to the electrode geometry used to derive Equation 3.1.

Example 7. Particle Mass Density as a Function of Silane Concentration

Figure 12A:
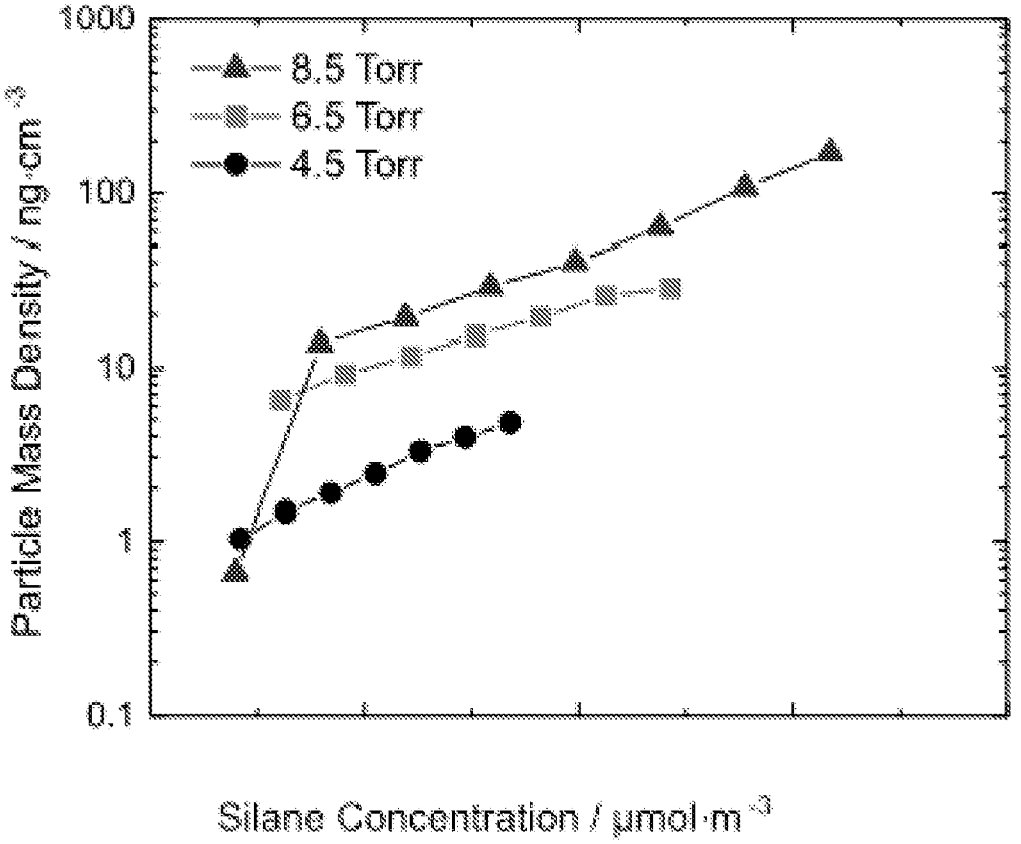
FIG. 12A is an exemplary embodiment of the mass deposition rate as a function of the silane concentration of the feed gas for various pressures given a balance gas of pure Ar in accordance with the present disclosure. Tube diameter was held constant at 17 mm.
Figure 12B:
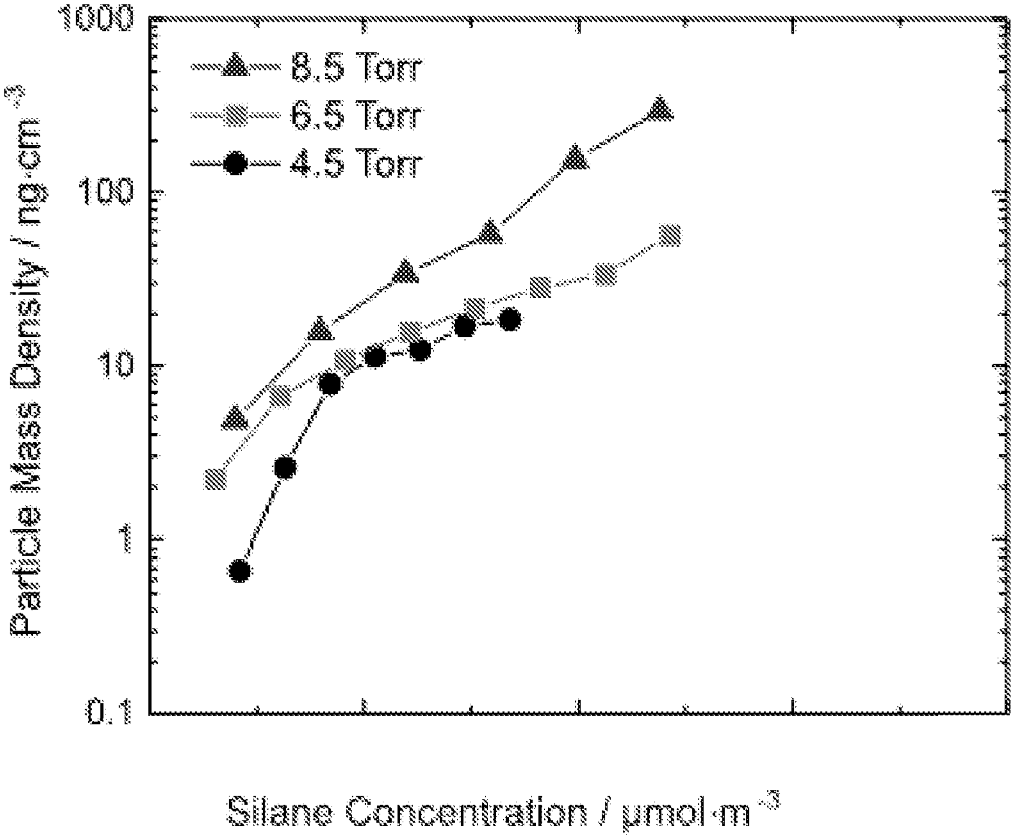
FIG. 12B is an exemplary embodiment of the mass deposition rate as a function of the silane concentration of the feed gas for various pressures given a balance gas of 10% $H_2$ in Ar in accordance with the present disclosure. Tube diameter was held constant at 17 mm.
Figure 12C:
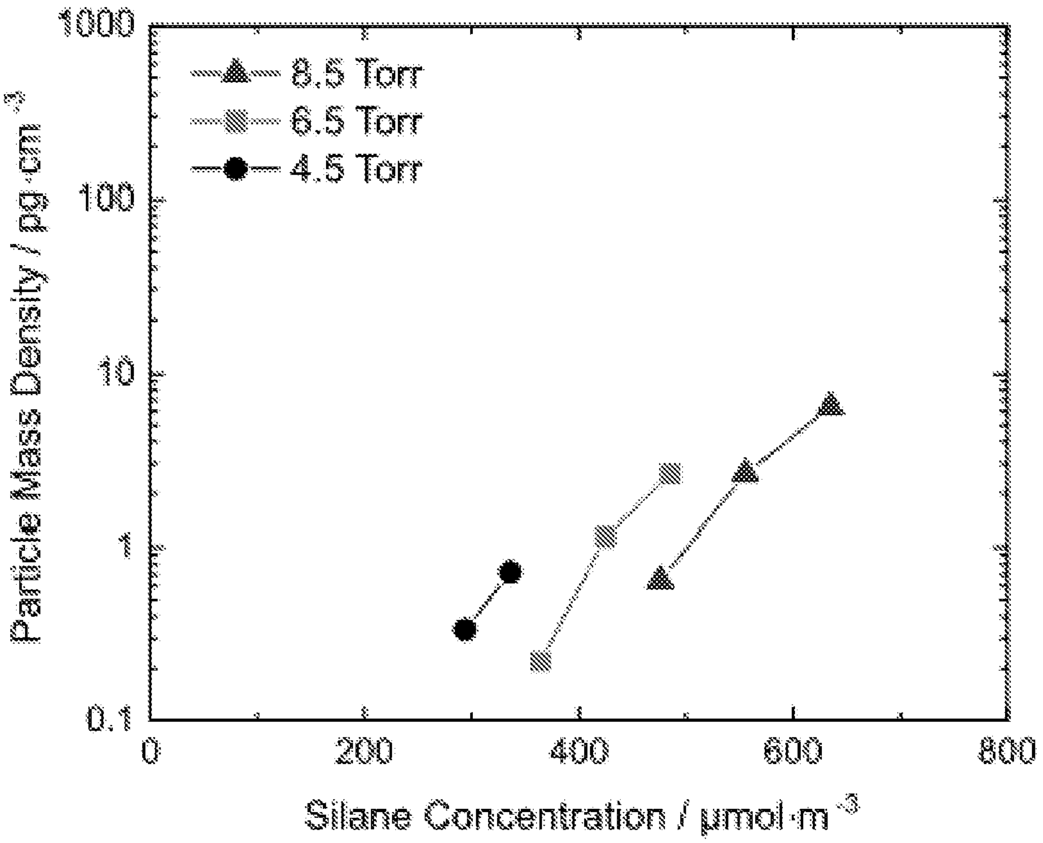
FIG. 12C is an exemplary embodiment of the mass deposition rate as a function of the silane concentration of the feed gas for various pressures given a balance gas of pure $H_2$ in accordance with the present disclosure. Tube diameter was held constant at 17 mm.

FIGS. 12A-12C show the same data as FIGS. 4A-4C; however, the x-axis was changed from silane fraction to silane concentration. This was performed using the ideal gas law to convert from molar fraction to molar density. Particle mass density is shown to increase with increasing pressure given a constant molar density of silane at the reactor inlet. This can be explained as increasing pressure reduces the diffusion coefficient of reactive species. Given a lower diffusion coefficient, species losses to the reactor walls are expected to be reduced.

Example 7. Mass Spectroscopy Results for the 32 mm Reactor Tube

Figure 13:
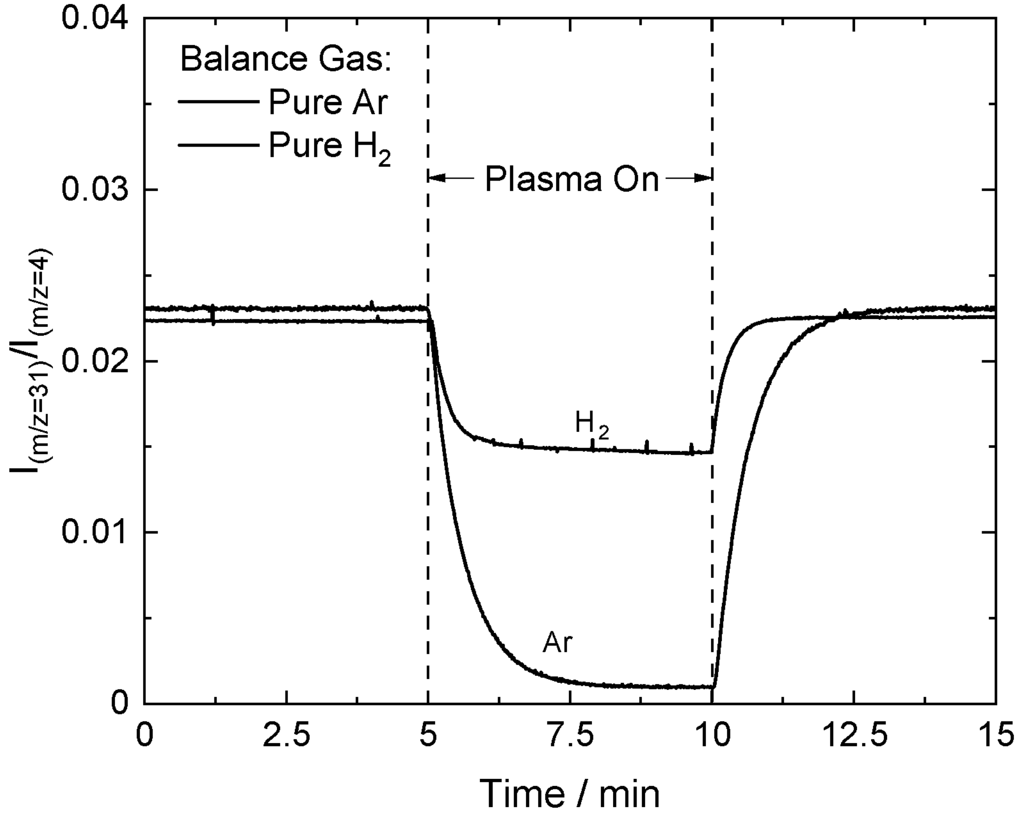
FIG. 13 is an exemplary embodiment of mass spectroscopy results showing the m/z=31 intensity (silane) over the m/z=4 intensity (helium) as a function of time given a balance gas of pure Ar or $H_2$ in accordance with the present disclosure. The reactor pressure was 6.5 Torr, and the tube diameter was 10 mm.

The mass spectroscopy results for the 32 mm reactor tube are shown in FIG. 13.

Example 8. Demonstration of Deposit on Reactor Tubes of Varying Diameters

Figure 14:
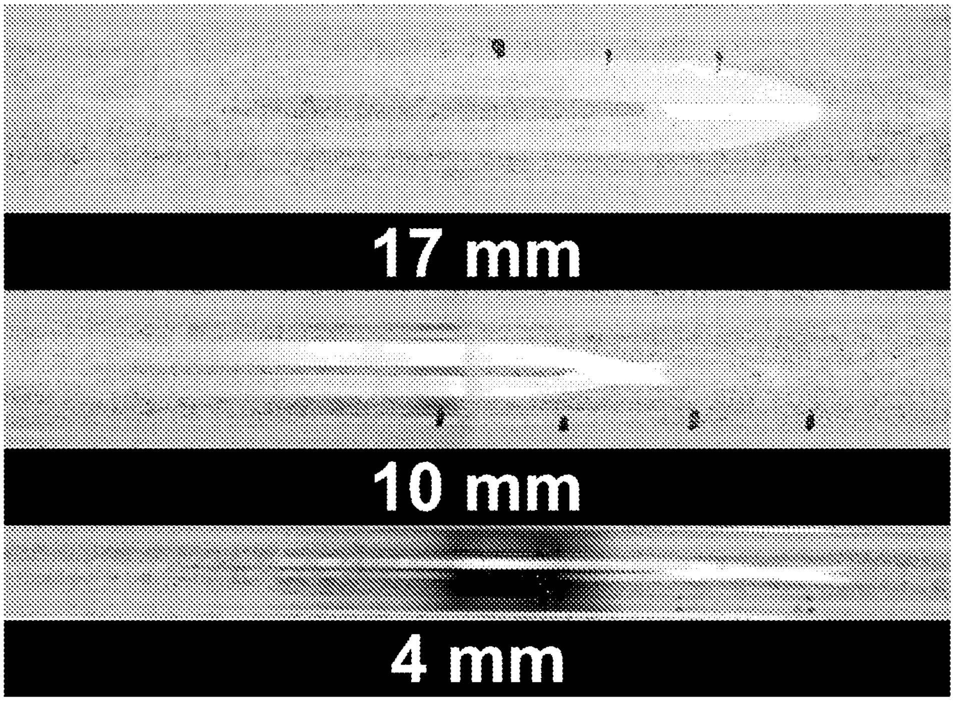
FIG. 14 is an exemplary embodiment of an image of the silicon deposit on reactor tubes of various sizes in accordance with the present disclosure.

FIG. 14 demonstrates how deposition on the reactor walls is enhanced for smaller tubes. Each tube was subject to the same experimental conditions and methods (apart from the variable tube diameter). A 4 mm tube is shown here to show an exaggerated effect. Deposition was eventually observed for tubes of all sizes upon further use.

In the present disclosure, a simple QCM impactor has been shown to be a promising method for sampling aerosolized particles (of sizes below 10 nm) under vacuum conditions at low mass densities. By depositing particles on the center of a QCM crystal, rather than over the entire area, device sensitivity was shown to increase by over an order of magnitude. Using this QCM impactor, particle mass densities from the effluent of a dilute silane plasma were determined. These mass densities were determined as a function of the inlet silane fraction, gas composition, reactor pressure, and reactor tube diameter. For an $Ar/He/SiH_4$ plasma, increasing the reactor tube diameter was shown to significantly increase particle mass density, and increasing the reactor pressure was also shown to increase particle mass density. These effects were greatly diminished when a high fraction of $H_2$ was used as the balance gas. From the results, it can be concluded that species diffusion to surfaces that act as sinks (e.g. reactor walls) plays a major role in determining whether film formation is favored over particle formation. Additionally, at reactor conditions of high hydrogen fraction, both particle formation and film formation appear to be suppressed; however, particle formation was suppressed to a greater extent.

The QCM impactor primarily consists of two components: the orifice nozzle and the QCM. Although these two components can be found individually in other devices, this disclosure is the first report of the precise combination of components that yields the numerous beneficial results demonstrated herein.

The QCM impactor disclosed herein is unique in at least two ways. First, there is impaction of particles onto a small area to improve device sensitivity and resolution. QCMs are known to have a sensitivity which is dependent on the location which the mass is deposited onto the quartz crystal. More specifically, the sensitivity is maximized if mass is deposited on the center of the quartz crystal and there is a steep decline in quartz crystal sensitivity if mass is deposited further away from the center. By impacting particles onto a point located at the center of the quartz crystal deposition surface, sensitivity can be increased by more than a factor of 10. In other applications with high aerosol mass loading, such as engine emission monitoring, deposition onto the center of the crystal has not been performed because it results in an unacceptably low usable lifetime for the QCM sensor element necessitating frequent and costly maintenance. However, deposition onto the center is ideal when attempting to detect particles at low mass concentrations, which is the case for semiconductor process monitoring applications.

Impaction of particles onto the center of a quartz crystal requires special design considerations. In the present device, the orifice size at the tip of the nozzle is made to be small (150 micrometers in diameter) to allow the particles to form a narrow beam with approximately the same diameter. The distance from the orifice to the QCM (the standoff distance) is also limited to approximately 1 centimeter to prevent spreading of the particle beam to less sensitive areas of the QCM crystal. Given these two design parameters, particles are impacted onto the center most sensitive portion of the quartz crystal deposition surface.

Second, there is specialized patterning of the quartz crystal electrodes to further increase device resolution and sensitivity. To function properly, quartz crystals require electrodes on each side (usually by depositing a pattern of gold). The geometry of the electrodes (both electrode thickness and patterning) has been shown to greatly affect quartz crystal sensitivity (both in magnitude and its radial dependence). Commercial QCM crystals have been optimized to maximize resolution assuming that mass is being spread over the entire quartz crystal area. However, a different electrode geometry would maximize sensitivity if the mass were deposited on the center of the quartz crystal (as is the present case). The device disclosed herein may optionally use electrode patterns and thicknesses that optimize sensitivity in a small circle in the center of the crystal surface. Specifically, increasing electrode thickness and decreasing the electrode radius may improve sensitivity for the device.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such a disclosure using the terms "consisting essentially of" or "consisting of".

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

What is claimed is:

1. A quartz crystal microbalance (QCM) impactor, comprising:

an orifice tube comprising an orifice nozzle;

a QCM sensor; and optionally a shutter;

wherein the QCM impactor is configured to deliver particles towards a detection position of the QCM sensor; and wherein a distance between the orifice nozzle and the QCM sensor is configured to prevent spreading of particles to less sensitive areas of the QCM sensor.

2. The QCM impactor according to claim 1, wherein the QCM impactor is configured to deliver particles within a distance of the detection position such that the sensitivity is in a range of from about 10% to about 95% of the maximum sensitivity.

3. The QCM impactor according to claim 1, wherein the QCM impactor is configured to deliver particles within a distance of the detection position such that the sensitivity is in a range of from about 10% to about 60% of the maximum sensitivity.

4. The QCM impactor according to claim 1, wherein the orifice nozzle comprises one orifice.

5. The QCM impactor according to claim 4, wherein a ratio between a diameter of the orifice and a distance between the orifice nozzle and the QCM sensor is in a range of from about 1:50 to about 1:100.

6. The QCM impactor according to claim 1, wherein a distance between the orifice nozzle and the QCM sensor is less than or equal to about 1 centimeter.

7. The QCM impactor according to claim 1, wherein the orifice nozzle comprises an orifice less than or equal to about 1 mm in diameter.

8. The QCM impactor according to claim 1, wherein the QCM impactor is configured to operate at a pressure below atmospheric pressure.

9. The QCM impactor according to claim 1, wherein the QCM sensor comprises a deposited pattern of metal.

10. The QCM impactor according to claim 1, wherein the particles are selected from nanoparticles, microparticles, semiconductor material particles, particles produced via etching, particles produced via condensation, synthesized particles, aerosolized particles, organic particles, metal particles, metalloid particles, nonmetal particles, compound metal particles, doped particles, silicon particles, silica particles, alumina particles, germanium particles, transparent conductive oxide particles, indium tin oxide particles, fluorine doped tin oxide particles, nitride particles, oxide particles, bromide particles, fluoride particles, chloride particles, carbide particles, arsenide particles, phosphide particles selenide particles, telluride particles, sulfide particles, antimonide particles, silicide particles, and combinations thereof.

11. A method of using a quartz crystal microbalance (QCM) impactor, comprising:

an orifice tube comprising an orifice nozzle;

a QCM sensor; and optionally a shutter;

wherein the QCM impactor is configured to deliver particles towards a detection position of the QCM sensor; and wherein a distance between the orifice nozzle and the QCM sensor is configured to prevent spreading of particles to less sensitive areas of the QCM sensor, the method comprising:

flowing a process gas comprising particles through the orifice tube and the orifice nozzle;

delivering the process gas comprising particles from the orifice nozzle to the QCM sensor; and quantifying a mass of the particles in the process gas.

12. The method of claim 11, wherein the mass of the particles in the process gas is quantified as a mass density.

13. The method of claim 11, wherein the process gas is a gas in an industrial process selected from semiconductor processes, particle formation processes, particle monitoring processes, particle synthesis processes, material deposition processes, material etching processes, pulsed laser deposition processes, sputter deposition processes, ion implantation processes, chemical vapor deposition processes, plasma-enhanced chemical vapor deposition processes, atomic layer deposition processes, plasma-enhanced atomic layer deposition processes, atomic layer etching processes, reactive ion etching processes, thermal annealing processes, thermal oxidation processes, plasma etching processes, photoresist exposure processes, direct laser write processes, molecular beam epitaxy processes, wafer bonding processes, x-ray photoelectron spectrometers, transmission electron microscopes, scanning electron microscopes, atomic force microscopes, scanning probe microscopes, scanning tunneling microscopes, plasma cleaning processes and combinations thereof.

14. The method according to claim 11, wherein the particles are selected from nanoparticles, microparticles, semiconductor material particles, particles produced via etching, particles produced via condensation, synthesized particles, aerosolized particles, organic particles, metal particles, metalloid particles, nonmetal particles, compound metal particles, doped particles, silicon particles, silica particles, alumina particles, germanium particles, transparent conductive oxide particles, indium tin oxide particles, fluorine doped tin oxide particles, nitride particles, oxide particles, bromide particles, fluoride particles, chloride particles, carbide particles, arsenide particles, phosphide particles selenide particles, telluride particles, sulfide particles, antimonide particles, silicide particles, and combinations thereof.

15. The method according to claim 11, wherein the QCM impactor is operated at a pressure below atmospheric pressure.

16. The method according to claim 11, wherein the QCM impactor is configured to deliver particles within a distance of the detection position such that the sensitivity is in a range of from about 10% to about 95% of the maximum sensitivity.

17. The method according to claim 11, wherein the orifice nozzle comprises one orifice.

18. The method according to claim 17, wherein a ratio between a diameter of the orifice and a distance between the orifice nozzle and the QCM sensor is in a range of from about 1:50 to about 1:100.

* * * * *